United States Patent
Kraus et al.

(10) Patent No.: US 9,791,290 B2
(45) Date of Patent: Oct. 17, 2017

(54) MANIPULATION OF USER ATTENTION WITH RESPECT TO A SIMULATED FIELD OF VIEW FOR GEOGRAPHIC NAVIGATION VIA CONSTRAINED FOCUS ON, PERSPECTIVE ATTRACTION TO, AND/OR CORRECTION AND DYNAMIC ADJUSTMENT OF, POINTS OF INTEREST

(75) Inventors: Daniel Kraus, Miami, FL (US); James D. Lynch, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 1279 days.

(21) Appl. No.: 13/408,589

(22) Filed: Feb. 29, 2012

(65) Prior Publication Data
US 2013/0222364 A1 Aug. 29, 2013

(51) Int. Cl.
G06T 17/05 (2011.01)
G01C 21/36 (2006.01)
G06Q 30/02 (2012.01)
G06T 19/00 (2011.01)

(52) U.S. Cl.
CPC ........... *G01C 21/367* (2013.01); *G06Q 30/02* (2013.01); *G06Q 30/0241* (2013.01); *G06T 19/003* (2013.01)

(58) Field of Classification Search
CPC ....... G06T 19/00; G06T 19/003; G06T 11/00; G06T 17/00; G06T 15/00; G06T 15/10; G06T 17/05; G01C 21/32; G01C 21/3682; G01C 21/36; G01C 21/3673; G01C 21/3679; G01C 21/367; G06Q 30/02; G06Q 30/0241
USPC ........................................ 345/419, 649, 440
See application file for complete search history.

(56) References Cited

U.S. PATENT DOCUMENTS

| | | | | |
|---|---|---|---|---|
| 5,276,785 | A * | 1/1994 | Mackinlay et al. | 345/427 |
| 2006/0103674 | A1* | 5/2006 | Horvitz et al. | 345/629 |
| 2006/0287810 | A1* | 12/2006 | Sadri et al. | 701/200 |
| 2009/0153549 | A1* | 6/2009 | Lynch et al. | 345/419 |
| 2010/0325589 | A1* | 12/2010 | Ofek et al. | 715/854 |
| 2011/0106595 | A1* | 5/2011 | Vande Velde | 705/14.4 |
| 2012/0221413 | A1* | 8/2012 | Alberth et al. | 705/14.58 |
| 2012/0274625 | A1* | 11/2012 | Lynch | 345/419 |

FOREIGN PATENT DOCUMENTS

WO   WO2009118911   * 10/2009

OTHER PUBLICATIONS

International Search Report and Written Opinion for PCT Application No. PCT/EP2012/073160, dated Aug. 1, 2013.

* cited by examiner

*Primary Examiner* — Gregory J Tryder
*Assistant Examiner* — Michael Le
(74) *Attorney, Agent, or Firm* — Alston & Bird LLP

(57) ABSTRACT

Manipulation of a user's attention is disclosed with respect to a point of interest represented in a simulated field of view of a geographic locality during simulation of travel between locations therein, such as by a computer-implemented navigation system or application. As a user virtually navigates a route, the simulated field of view presented on a display thereto may be constrained, immediately or gradually to an orientation, different from the direction of travel or otherwise from an orientation selected by the user, which focuses on, or otherwise includes the point of interest, or a representation thereof. In this manner, the user's attention is directed or otherwise drawn to the point of interest, e.g. they are less likely to miss or ignore it.

37 Claims, 15 Drawing Sheets

US 9,791,290 B2

MANIPULATION OF USER ATTENTION WITH RESPECT TO A SIMULATED FIELD OF VIEW FOR GEOGRAPHIC NAVIGATION VIA CONSTRAINED FOCUS ON, PERSPECTIVE ATTRACTION TO, AND/OR CORRECTION AND DYNAMIC ADJUSTMENT OF, POINTS OF INTEREST

BACKGROUND

Image-based navigation applications and systems, collectively referred to herein as systems, have become a popular tool, and/or feature of map based navigation applications or systems, for visually simulating being in or traveling between locations within a geographic locality, such as cities, countries, etc. In one type of system, a computer displays to a user a simulated field of view using photographic images previously captured in a real-world geographic locality. As the user virtually navigates through a representation of the depicted geographic locality, such as by instructing the system to change their virtual location and/or to virtually "turn their head" or otherwise "look around," the computer keeps up with the user's navigation and displays an updated simulated field of view which may include different photographic images taken from the real-world locality that represent the user's current location and/or point of view. Thus, an experience of actually looking around and/or moving through the represented locality may be evoked. One system for performing this kind of feature is disclosed in U.S. Pat. No. 7,688,229, the entire disclosure of which is incorporated by reference herein.

Image-based navigation systems, including those described above, typically utilize an image dataset which includes a collection of images and/or video which were previously collected by a set of one or more cameras carried through the geographic locality. The camera(s), which may be mounted on a vehicle or carried by a person, may take pictures (or video) in one or more directions or orientations as the vehicle or person moves. This method of capture may include the taking of numerous, overlapping pictures from several points of view, which allows the set of pictures to be post-processed, e.g. stitched or otherwise aggregated or composited together, to create substantially seamless panoramic images covering various fields of view at each location. These images may also be correlated with real-world geography, for example by gathering GPS or other geographic coordinate data and/or postal address data, along with camera orientation data and or date/time of collection, at the same time as the pictures are taken. This allows a user to specify, for example, a geographic location or a postal address, as well as an orientation/point of view, and then the navigation system may select and/or aggregate/composite the appropriate images from the image data set to present to the user a simulated field of view showing the specified geographic location from the user's chosen point of view. When a user specifies a starting location and a destination location within the geographic locality, the image-based navigation system may compute a navigation route, such as by using a map database, from the starting location to the destination location and then sequentially present, e.g. continuously or incrementally, appropriate images, or aggregates/composites thereof, selected from the image data set corresponding to locations along the route as the user virtually navigates the route, thereby providing the user with a simulated experience of travelling the route including being able to visually experience land marks, signs, storefronts, display advertising and other points of interest, along and around the route.

As will be appreciated, during such virtual navigation, the user's attention may be focused on the route itself, e.g. they may be mentally preparing for, or in the process of, actually navigating the route. Some points of interest may lie outside the simulated field of view due to the orientation thereof during the simulated travel. Further, the sheer volume of visual information presented to the user via the various images may be substantial, such as when virtually navigating through dense urban localities. In addition, some visual details in the images may be obscured or indistinguishable due to the current perspective of the virtual point of view, e.g. in the direction of travel, or due to artifacts of the image capture or panoramic image creation processes. Accordingly, a user may consciously or subconsciously ignore, be blinded to, or otherwise miss or fail to see or appreciate a point of interest as they virtually "approach" or "pass by."

DETAILED DESCRIPTION

Figure 1A:
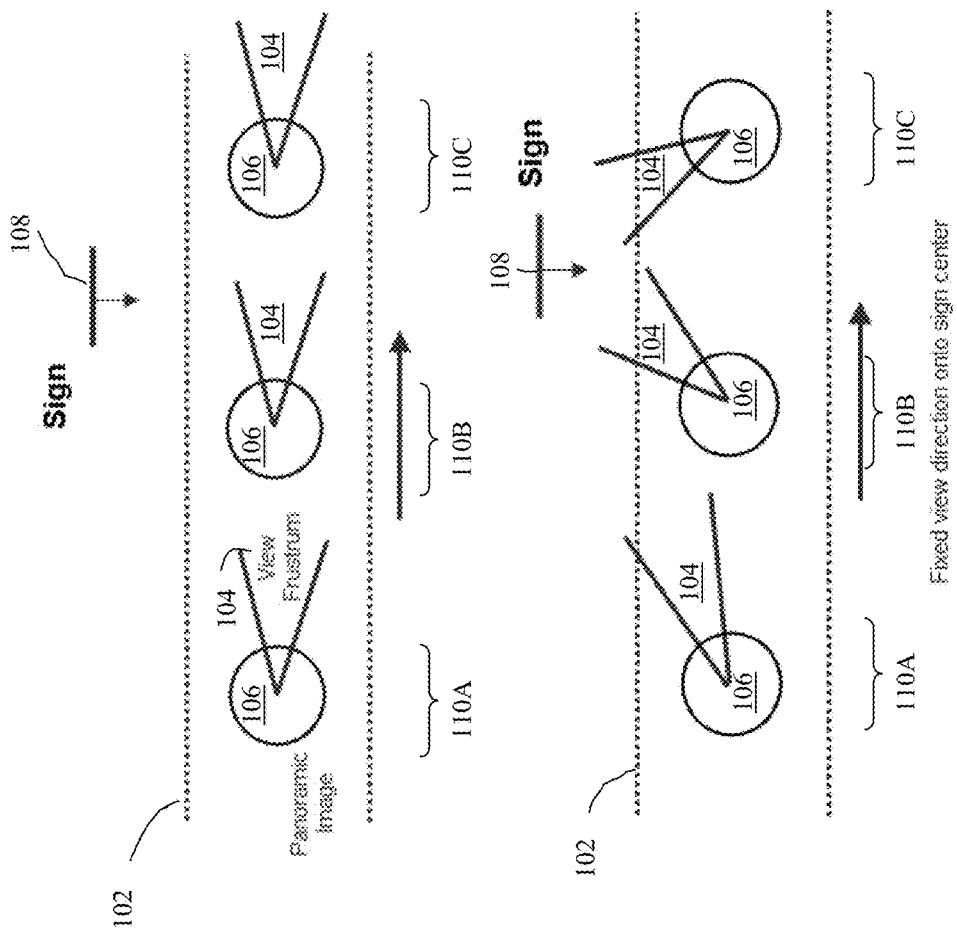
FIG. 1A is diagram depicting a simulated field of view of an observer oriented in a direction of travel as the observer travels by a point of interest.

The disclosed embodiments relate to manipulation of a user's attention with respect to a point of interest represented in a simulated field of view of a geographic locality, such as when simulating the user's presence at a particular location therein or initiating and/or during simulation of travel between locations therein, such as by a computer-implemented navigation system or application. In one embodiment, when a user chooses to view a particular location, initiates virtual navigation, or otherwise as the user virtually navigates a route, the simulated field of view presented on a display thereto may be constrained to an orientation, different from the direction of travel or otherwise from an orientation selected by the user, which focuses on, or otherwise includes the point of interest, or a representation thereof. In this manner, the user's attention is directed or otherwise drawn to the point of interest, e.g. they are less likely to miss or ignore it. Alternatively, or in addition thereto, the orientation of the simulated field of view may be constrained to an orientation away from a point of interest, such as where the point of interest would be distracting or uninteresting to the user. In one embodiment, the orientation of the point of interest, as represented within the simulated field of view, may be altered, instead of or in addition to alteration of the orientation of the field of view, to improve its optical visibility or otherwise distinguish it from its surrounding environment, such as by altering its perspective to better align it with the orientation of the simulated field of view and/or altering its size/scale or other aspects of its presentation. To avoid distracting transitions or other changes to the simulated field of view, which may annoy or otherwise disorient or distract the user, the orientation of the field of view and/or orientation of the POI may be gradually or incrementally altered according to the constraint as the simulated navigation progresses along the route, e.g. as the user's simulated location approaches and/or retreats from the location of the point of interest.

Generally, the disclosed embodiments may be used to alter a user's viewpoint and/or alter signs, advertisements and other POI's so as maximize exposure to the user. The viewpoint direction may be modified to keep a POI in view the field of view or may be altered to maintain a fixed size of the POI on a display and/or the POI may be rotated, warped, or scaled to orient it perpendicular to the viewer so as to, for example, minimize perspective scaling of the sign.

As used herein, a point of interest ("POI") includes an object, feature, landmark, artifact or other item, which a person, such as a user of the disclosed embodiments, may find useful, entertaining or otherwise interesting or to which another user or entity, e.g. a sponsor, may wish to draw attention. A POI may include a building or façade thereof, store-front, sign, poster, banner, product, or other object. In particular, POI's may include advertisements such as signs, banners, bill-boards, store-fronts, etc. A point of interest may be physically located at a particular geographic location within a geographic locality, referred to as the point of interest ("POI") location, various images of which, such as images of the POI and/or POI location taken from different locations and/or orientations, may be captured and stored for use by the disclosed embodiments, as will be described. The geographic locality may be any geographic region, including the planet Earth, or a portion thereof, demarcated by geographic, geopolitical or other boundaries. Alternatively, or in addition thereto, a POI 108, i.e. a computer generated representation thereof, may be artificially created, overlaid or otherwise virtually positioned represented as appearing at a POI location within a simulated field of view of the disclosed embodiments having an orientation toward the POI location. A virtual POI may be used when a real version of the virtual POI does not exist at the POI location and may be used to obscure an actual POI, which may be similar or different from the virtual POI, that is located at the POI location. As used herein, references to a POI or POI location may refer to an actual POI located at the POI location or a virtual/artificial POI generated by the disclosed embodiments and presented as if located at the POI location.

As was described above, during virtual simulation or navigation, the user's attention may be focused on the surrounding environment of their location or route, e.g. they may be mentally absorbing the visual presentation, or preparing for, or in the process of, actually navigating the route. For example, they may be evaluating the route for efficiency or otherwise making mental notes of certain POI's or other visual cues along the route that they will look for when they are actually navigating the route in real life so that they know they are going in the right direction. Some POI's, because of their POI location, may never be represented within the simulated field of view due to the orientation thereof during the simulated navigation. Further as discussed, the sheer volume of visual information presented to the user via the various images presented in the simulated field of view may be substantial, such as when virtually simulating locations in, or otherwise navigating through, dense urban localities. This may make it difficult to distinguish a particular POI from its surrounding environment. In addition, some visual details in the images may be obscured or rendered indistinguishable due to the current perspective of the virtual point of view, e.g. in the direction of the virtual point of view or of travel, or due to artifacts resulting from the image capture or panoramic image creation processes. Accordingly, a user may consciously or subconsciously ignore, be blinded to, or otherwise miss or fail to see or appreciate a point of interest due the initial orientation presented when they initiate simulation or navigation or as they, for example, virtually "pass by." In some cases, such as with advertisements which may be located along the route, whether physically located or virtually inserted, a usability phenomenon, commonly associated with web site advertising, may occur, referred to as "banner blindness," where the user consciously or subconsciously ignores the POI though it is within the simulated field of view.

It will be appreciated that, without external intervention, a user's attention is sometimes drawn to one particular POI when they virtually navigate through the locality depicted in an image dataset. U.S. Patent Application Publication No. 2009/0153549 to Lynch, et al., the entire disclosure of which is incorporated by reference herein, discloses a system and method for creating multi-angle views of an object-of-interest, i.e. a POI, from images stored in a dataset. An interested user may then specify the location of an object-of-interest and as the user virtually navigates through the locality represented by the image dataset, his current virtual position is determined. Using the user's virtual position and the location of the object-of-interest, images in the image dataset are selected and/or modified and interpolated or stitched together, if necessary, to present to the user a view from his current virtual position looking toward the object-of-interest. Further, the system enables the object-of-interest to remain in the view no matter where the user virtually travels. From the same image dataset, another user can select a different object-of-interest and virtually navigate in a similar manner, with his own object-of-interest always in view. The object-of-interest also can be "virtual," added by computer-animation techniques to the image dataset. For some image datasets, the user can virtually navigate through time as well as through space. Several techniques may be employed, separately or together, when populating an image dataset so that it can provide multiple views of an object-of-interest. The images in the dataset can be "registered," that is, when the images are collected, the objects in the images are associated with their geographic locations. For example, a GPS unit on the camera tells where the camera was located when an image was taken and the direction in which the camera was facing. A range-finding device (e.g., LIDAR) tells how far away an object in the image is from the location of the camera. However, if, as described, a user fails to notice or otherwise ignores a POI, they may miss it, i.e. they may not intervene during their simulated navigation of the route to alter the simulated field of view as described above.

Accordingly, in some cases, it may be desirable to cause, force or otherwise increase the likelihood that the user, distracted, oblivious, obstinate or otherwise, will pay attention to, i.e. cognitively process, or otherwise engage, notice, distinguish or recognize a particular POI, individually or with respect to other POI's, which may be geographically located along or near their simulated position or simulated navigation route but which are not necessarily within the user's current simulated field of view and/or which may be less than optimally visually oriented or distinguishable with respect to the scene represented in the simulated field of view. Similarly, it may be desirable to direct the user's attention away from, or otherwise decrease the likelihood of their attention being drawn to certain POI's which may be geographically located along or near their simulated navigation route. It will be appreciated that, as described above, the disclosed embodiments may be used to define the initial simulated field of view presented to the user upon commencing simulation of navigation of a route, or when the user merely selects a geographic location to view from a singular position, in addition to manipulating the simulated field of view as the user navigates, as described herein.

For example, based on a profile of the user, provided by or on behalf thereof, such as a demographic and/or preference profile, the navigation system/application may determine POI's which may be geographically located along the user's simulated navigation route, some of which may be of interest to the user and some of which may not be of interest to the user. Such a profile may be created based on explicit preferences specified by the user and/or by other means such as by monitoring user activities and/or behavior, such as a user's activities and/or behavior with respect to web sites devoted to electronic commerce or searching. Alternatively, or in addition thereto, profile information may be obtained from third parties such as Internet search engines and/or Internet advertising services.

Alternatively, or in addition thereto, such as in combination with a user's preferences or profile, third parties, e.g. sponsors, may request the operators/publishers of a navigation system/application, according the disclosed embodiments, such as in exchange for compensation thereto, draw attention to and/or divert attention from one or more POI's when those POI's are along or near a user's present simulated position or simulated navigation route. Such a POI may include, for example, the sponsor's storefront, advertisement or product. In one embodiment, a free or discounted navigations system/application, or other services such as free traffic information or alerts, may be provided to a user where the cost of such a system/application, or access thereto, is paid for by one or more sponsors in exchange for direction of the user's interest towards POI's associated with the sponsoring entities. This may be implemented similar to web site, search engine or mobile-application delivered advertisements such as DoubleClick™, etc. For example, sponsors may pay for or bid on locations or regions near or through which the user will be routed during their simulated navigation. As such, a given route may take a user past or near POI's of different sponsors, to which the user's attention will be directed, as described below. Alternatively, or in additional thereto, a particular sponsor may pay or bid for an entire route, or portion thereof, such that the user's attention is drawn only to those POI's along or near the route, or portion thereof, belonging to the sponsoring sponsor. Alternatively, a sponsor may pay for or bid to have a navigating user's attention directed away from a competitor's POI. Further, the degree or extent to which a navigating user's attention is directed to a particular POI may be dependent upon the amount of compensation provided by a sponsor, e.g. whether the simulated field of view is altered merely to bring the POI within the view, altered to further center the simulated field of view on the POI, and/or keep the simulated field of view focused on the POI for a particular duration after which the user is free to change the simulated field of view.

FIG. 1A is diagram depicting simulated navigation along a route 102 showing the orientation of a simulated field of view ("FOV") 104 as would be observed by an observer 106, i.e. a hypothetical or simulated observer 106, located at a particular location along the route 102 and oriented in a direction of travel, i.e. toward a destination or subsequent "intermediate" location along the route 102 prior thereto, as travel of the observer 106 is simulated to pass within the vicinity, e.g. by/near or within a defined range, of a point of interest ("POI") 108. The examples depicted in the figures generally show linear or incremental progression of the observer 106 at various intermediate locations, referred to as intermediate observation locations, 110A-C along a route 102, e.g. as the observer 106 travels down a street. As described herein, at each intermediate observation location 110A-C, the simulated FOV 104 may be updated to include one or more appropriate images, or composites/aggregates thereof, which may be selected from an image data set corresponding to the present location of the observer 106 and the particular orientation of the simulated FOV 104 as specified by the disclosed embodiments. As used herein, updating or reorientation of the FOV 104 refers to the selection and/or modification and presentation of one or more images or composites/aggregates thereof from an image data set which represent the FOV 104 as would be observed by the observer 106 at the particular location and in the altered, updated or reoriented orientation, to replace or substitute for one or more images or composites/aggregates thereof which represent the unaltered, prior or original orientation. It will be appreciated that an intermediate observation location 110A-C may include the starting or ending (destination) location 110A, 110C of the navigation route 102, or locations there between via which the user's navigation is simulated, whether or not the simulated navigation "stops" or otherwise pauses at the location or is simulated to move, e.g. continuously, there through en route to the next intermediate observation location or the destination location, and that the number of intermediate observation locations 110A-C, their location/distribution along the route and relative distance/increments there-between, between (or including) a given starting location and a destination location may be dependent upon the implementation of the image capture process and/or the navigation system/application, e.g. dependent upon the image capture frame rate, resolution, processing power, data storage or communications bandwidth. Further, the number of intermediate observation locations 110A-C may vary, e.g. dynamically, depending upon, for example, the bandwidth of the communication medium between the image data storage and the navigation system/application, e.g. the higher bandwidth the medium, the more intermediate observation locations 110A-C may be included along the route 102. It will be appreciated that other technologies or techniques for improving the efficiency of use of available bandwidth may also be used, such as data compression and data caching. For example the number of intermediate observation locations 110A-C may be of sufficient number to so as to provide the illusion of a seamless or otherwise continuous progression along the route 102. By processing the user's viewpoint-navigation choices quickly, it will be appreciated that the resulting simulated FOV's 104 may be presented as a video continuously, or nearly continuously, i.e. providing the illusion/perception of substantially seamless, e.g. movie-like, movement along the route 102. Further, while the disclosed embodiments generally relate to panoramic image data sets, such as may be obtained via a vehicle based, e.g. geographic or geo-registered, image data acquisition system, such as the system disclosed in U.S. Patent Application Publication No. 2009/0153549 A1 to Lynch, et al, it will be appreciated that any image data set providing the necessary data may be used and that all methods of acquisition of such a data set, now available or later developed, are contemplated. This includes image data sets gathered in real time or otherwise substantially contemporaneously with the access thereto, such as may be implemented in a remote, live view or augmented reality application.

An FOV 104 or simulated FOV 104, also referred to as field of vision or angle of view, is the extent of the observable world that may be seen at any given moment and, with respect to photography, may describe the angular extent of a given scene that is imaged by a camera. In other words, as shown in FIG. 7B, given a set of observable locations 702 of a geographic locality which may be visible to an observer 106 located at a given location and oriented in any orientation, i.e. able to look in any direction, the FOV 104 or simulated FOV 104 includes the subset of those observable locations 704 which would be visible to the observer 106 at the location and oriented in a particular orientation. As will be described, one POI 108A may be located at a POI location within the set of observable locations 702 but outside the subset 704 defined by the FOV 104, and thereby may not be seen by the user, while another POI 108B may be located within the subset 704 and may therefore be seen. When speaking in terms of a simulated FOV 104 presented on a two dimensional display, such as a computer monitor, as may be implemented by the disclosed embodiments, one may refer to a "frustum" which is the portion of a solid (normally a cone or pyramid) that lies between two parallel planes cutting it. The term is commonly used in computer graphics to describe the three-dimensional region which is visible on the computer screen, the 'viewing frustum', which is formed by a clipped pyramid.

Figure 7A:
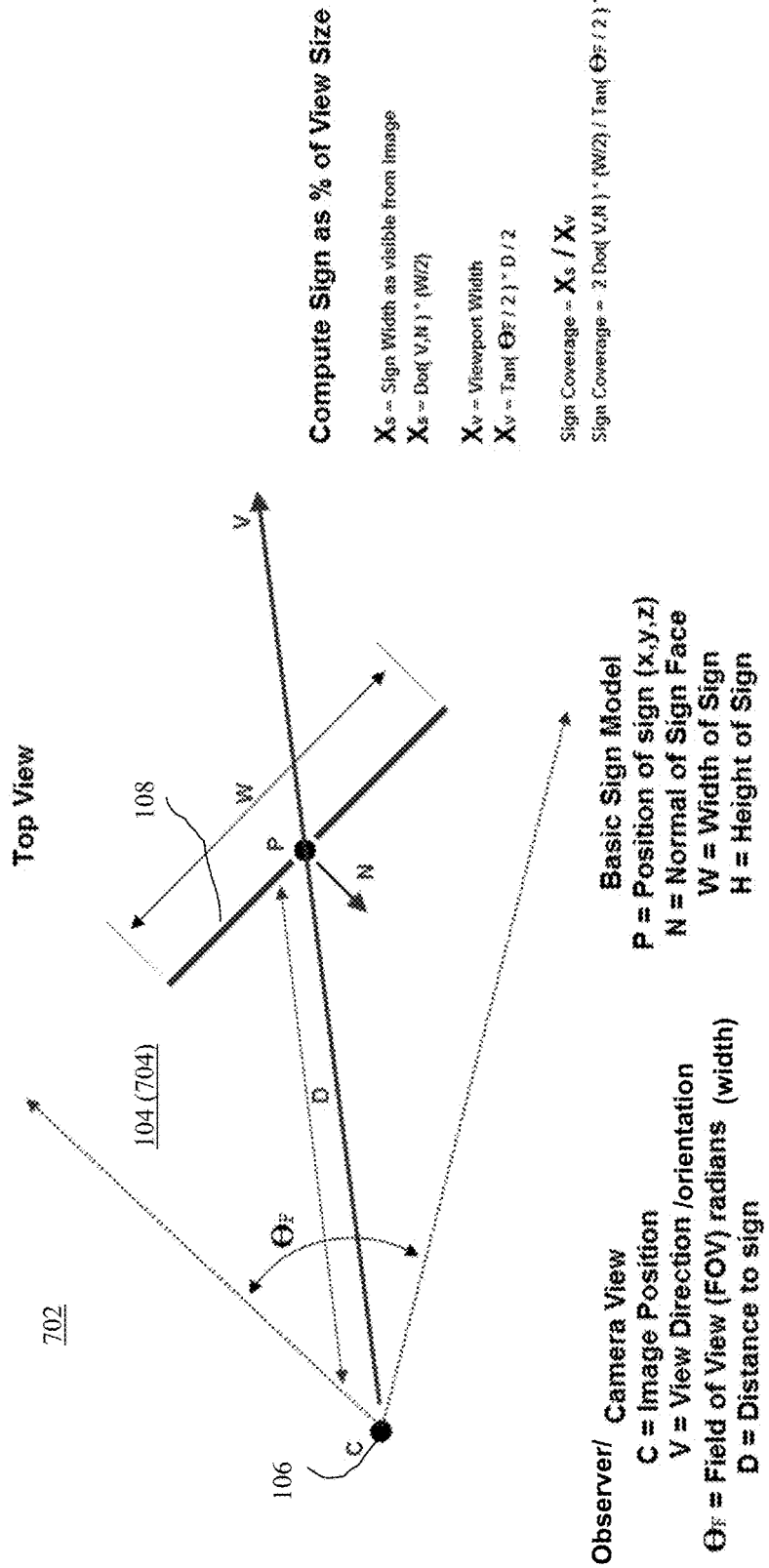
FIG. 7A is a diagram depicting parameters of a simulated field view in relation to a point of view and the parameters thereof.
Figure 7B:
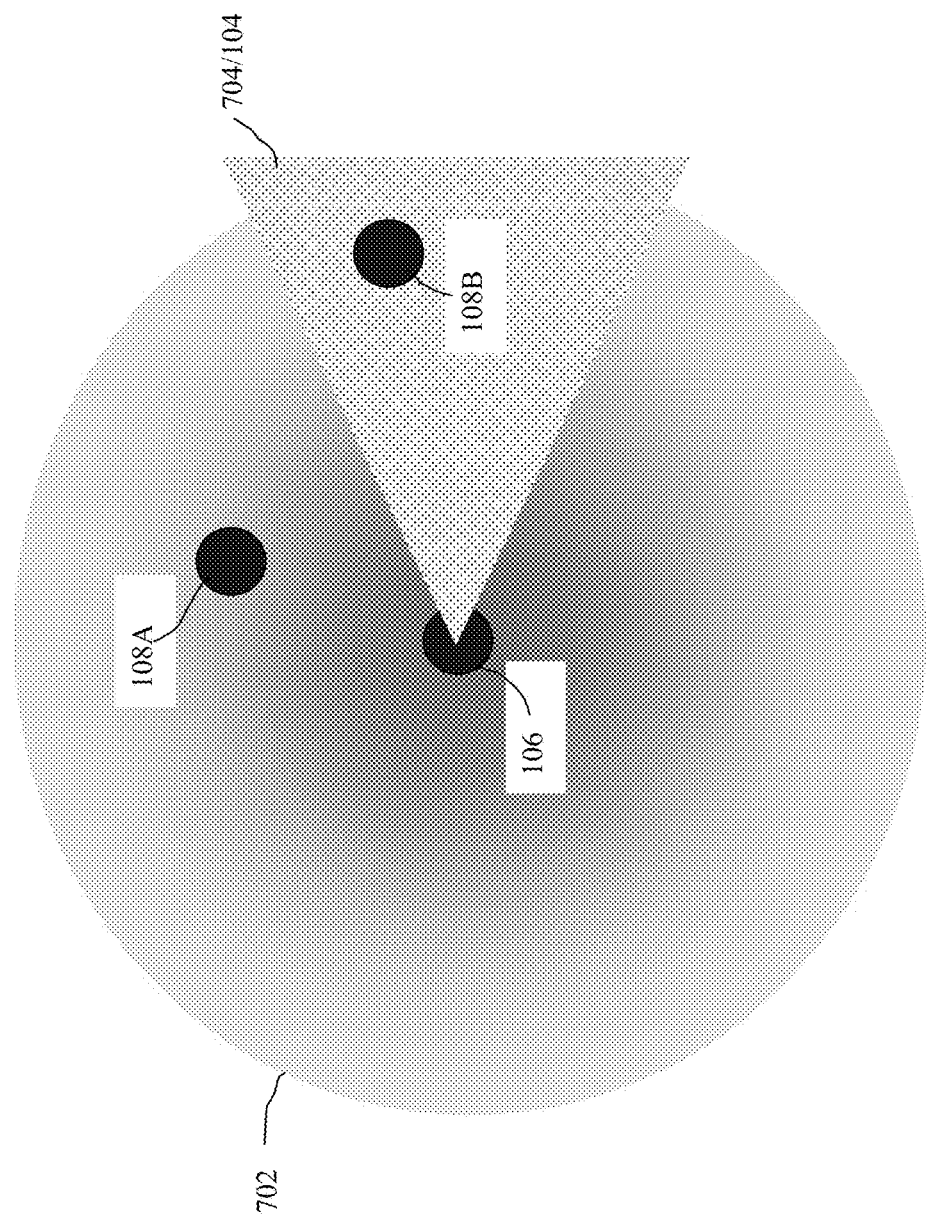
FIG. 7B is a alternative diagram depicting a simulated field of view.

As shown in FIG. 7A, a simulated FOV 104, as presented by the disclosed embodiments, may be characterized by the location of the simulated/hypothetical observer 106, referred to herein as the observer 106, e.g. the geographic location ("observation location") from which the image(s) used to construct the simulated FOV 104 were taken, such as with a camera, and the orientation of the simulated FOV 104, which may include the width and/or height of the FOV 104, the direction and/or elevation of the FOV 104, i.e. the direction/angle in which the observer 106 is facing. The FOV 104 may be further characterized by parameters of the camera and/or lens used to capture the images, such as pixel resolution, focal length/distance, depth of field, etc. As used herein, the terms FOV 104 and simulated FOV 104 will generally be used interchangeably to refer to the simulated FOV 104 presented to a user of the navigation system/application via a display coupled therewith using one or more images, or aggregates/composites thereof, and implemented according to the disclosed embodiments to depict what an observer 106, e.g. via a camera view finder, would see if they were actually located at a particular location and oriented in a particular orientation at the time the image(s) were captured or otherwise subject to the parameters characterizing the FOV 104 as described herein. It will be appreciated that selected images may modified, e.g. magnified, cropped or otherwise altered, to create appropriate images for use by the disclosed embodiments, such as where an original image having the appropriate characteristics is not present in the image data set.

Herein, the phrase "coupled with" is defined to mean directly connected to or indirectly connected through one or more intermediate components. Such intermediate components may include both hardware and software based components. Further, to clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions here before or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

Figure 5:
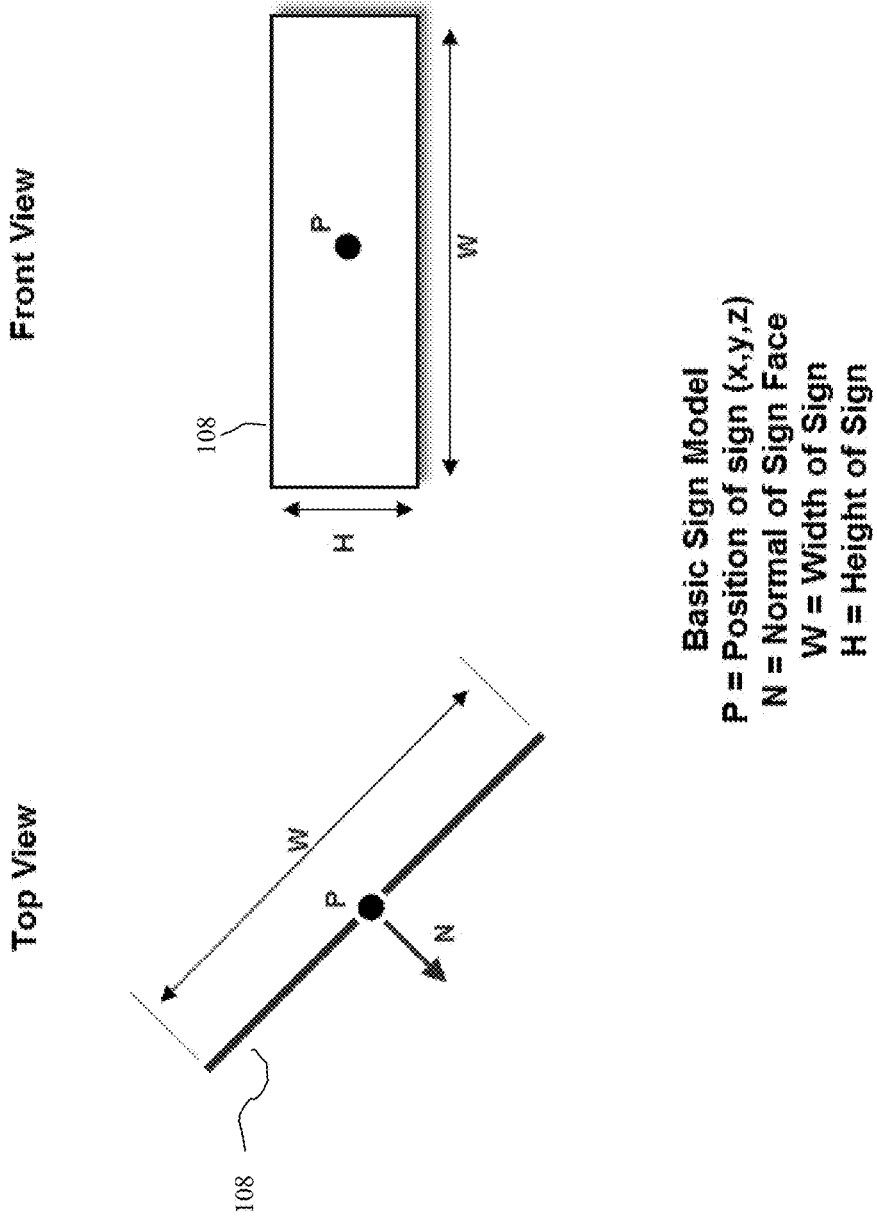
FIG. 5 depicts an exemplary point of interest for use as may be depicted in the simulated field of view of the system of FIG. 11.

Similarly, as shown in FIG. 7A, and in more detail in FIG. 5, a particular POI 108, including an existing POI 108 or a virtually created POI 108, may be characterized by a geographic location ("POI location"), an orientation with respect thereto, and a size or scale, e.g. height/width, diameter, altitude, etc. As used herein, the terms POI 108 and POI location may be used interchangeably when discussing movement of the observer 106 with respect thereto. For example, when the observer 106 is represented/simulated as approaching, passing or retreating from the POI 108, it will be understood that the observer 106 is in fact being simulated as approaching, passing or retreating from the POI location where the POI 108 is actually or virtually located. The orientation of the POI 108 may be characterized based on a direction of a normal (right angle) of a surface, or point in the case of a cylindrical shape, of the POI 108, with respect to a geographic coordinate system, the route 102, or other metric or scale. For example, a POI 108 may be a billboard located at a particular latitude and longitude and having a surface of a particular height and width featuring or otherwise bearing an advertisement collateral wherein the normal of the advertising-bearing surface is oriented toward a particular direction, e.g. 36 degrees south by southwest, or other location. In the case of POI's 108 which change over time, such as a computer controlled or otherwise electronic or mechanical multi-advertisement billboards/displays, the POI 108 may be further characterized by a temporal parameter associated with the time images of the POI 108 were captured, the cycle time of the variations in the display, etc. A POI 108 and/or an FOV 104 may be further characterized relative to each other, such as by the relative route or geographic distance between the starting, ending or any of the intermediate observation locations 110A-C of the FOV 104 and the POI location and/or by a relationship between the perspective and/or orientation of the FOV 104 and the perspective and/or orientation of the POI 108 to each other or to another reference. With respect to simulated movement of the observer 106, the FOV 104 and/or POI 108 may be further characterized by a rate and/or magnitude of change in the relative distance, perspective and/or orientation.

As shown in the example of FIG. 1A, the FOV 104 of the observer 106 is oriented in a direction, such as a direction of travel, from one intermediate observation location to the next subsequent intermediate observation location 110A, 110B, 110C, which is perpendicular to the orientation of the POI 108. Further, as depicted, the width of the FOV 104 is such that the POI is excluded, i.e. visually excluded. Accordingly, the observer 106, or more particularly, a user viewing a simulated FOV 104 based on the observer 106 would likely not see the POI 108 therein from their current position or as they virtually approached and/or passed it, i.e. the POI location, by as shown. Further, if the width of the FOV 104 was wide enough to include the POI location, the orientation of the POI 108 being perpendicular to the direction of the field of view or direction of travel may make it difficult for the user to perceive, e.g. the POI 108 as represented in the FOV 104 may appear distorted, indistinguishable from the surrounding image elements/depicted environment, and/or unintelligible.

Figure 1B:
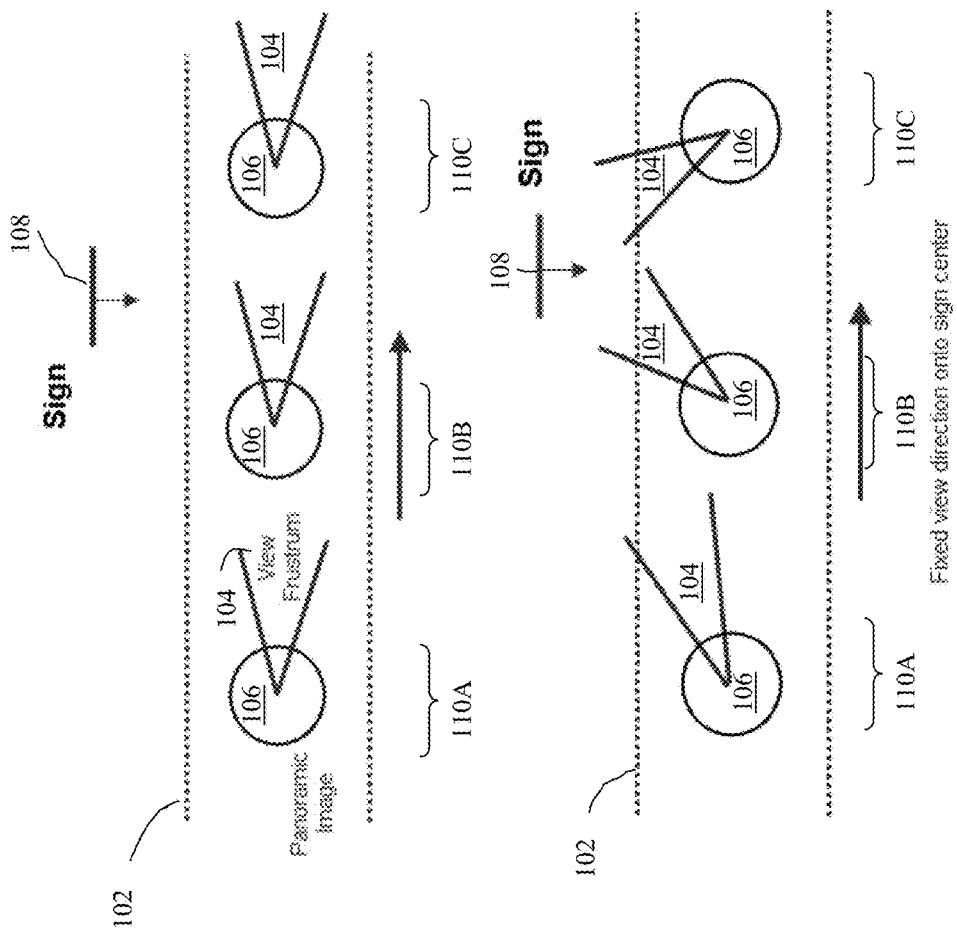
FIG. 1B is a diagram depicting exemplary variation of a simulated field of view of an observer as the observer travels by a point of interest according to one embodiment.

FIG. 1B is a diagram depicting exemplary variation of a simulated FOV 104 of an observer 106 as the observer travels by a point of interest 108 according to one embodiment. In the example of FIG. 1B, the FOV 104 of the observer 106, which may be oriented in the direction of travel, in a user selected orientation or otherwise away from the POI 108, is automatically reoriented and/or constrained, e.g. rotated, pivoted, translated and/or declinated/elevated, toward the POI 108, e.g. a different FOV 104, i.e. one or more appropriate images are selected from the image data set as described above, is presented at each successive intermediate observation location 110A-C, so as to maintain focus on the POI 108 as the observer 106 progresses along the intermediate observation locations 110-A-C up to and past the POI 108. Accordingly, the observer 106, or more particularly, a user viewing a simulated FOV 104 as would be observed by the observer 106, would likely to perceive or otherwise be focused on the POI 108 as they virtually approached and passed it by as shown. While not depicted, as will be discussed below, the FOV 104 from a intermediate observation location 110A-C located a defined distance from the POI 108 may be oriented in the direction of travel or in an otherwise user selected orientation. As the observer 106 moves closer to the POI 108, i.e. transitions to ever closer intermediate observation locations 110A-C, the FOV 104 may transition/reorient from an orientation toward the direction of travel, or user selected orientation, to an orientation directed toward the POI 108. Such as transition may be immediate or, as will be described, may be a gradual/incremental transition/reorientation occurring over time and/or a several intermediate observation locations 110A-C, e.g. based on proximity to the POI 108, so as to avoid a jarring change in orientation which, for example, may disorient or otherwise confuse or annoy the user. In one embodiment, the orientation of the FOV 104 may be incrementally altered so that at the intermediate observation location 110B that is geographically closest to the POI 108, the POI 108 is shown substantially in the center of the FOV 104. It will be appreciated that the extent to which the POI 108 may be centered in the FOV 104 when the observer 106/simulated navigation reaches the closest intermediate observation location 110B along the route 102 may be a function of the speed of simulated movement along the route, the number of intermediate observation locations 110A-C along the route and/or the maximum allowable rate of change to the FOV 104 orientation. In one embodiment, the orientation of the FOV 104 may be altered only as much as is necessary to bring the POI 108 into the FOV 104, e.g. to provide a "glimpse."

Figure 2:
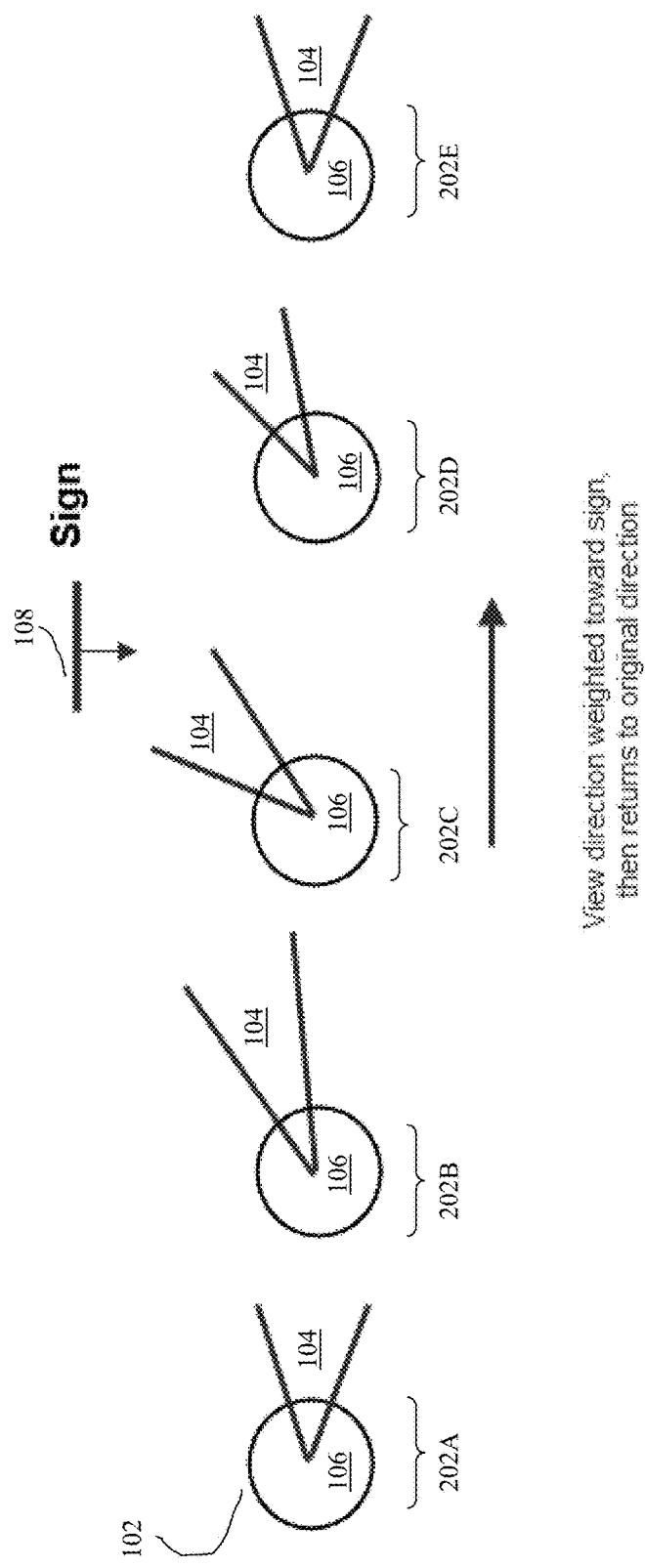
FIG. 2 is a diagram depicting exemplary variation of a simulated field of view of an observer as the observer travels by a point of interest according to one embodiment.

FIG. 2 is a diagram depicting exemplary variation of a simulated FOV 104 of an observer 106 as the travel of the observer 106 is simulated travelling by, i.e. approaching, passing and retreating from, a POI 108 according to one embodiment. As depicted in the example, when the observer 106 is located at a first intermediate observation location 202A, the FOV 104 is initially oriented along the direction of travel, or other user selected FOV 104 orientation wherein the POI 108 is not visible therein. As the observer 106 moves to successive intermediate observation locations 202B, 202C, the FOV 104 is automatically reoriented toward the POI 108. As noted above, as between intermediate observations locations 202A and 202B and the intermediate observation locations 202B and 202C, the reorientation of the FOV 104 may be immediate or may be gradually implemented. As the observer 106 passes by and ultimately retreats from the location of the POI 108, e.g. from intermediate observation locations 202C to 202D and from 202D to 202E, the orientation FOV 104 may be returned to the direction of travel, to the initial FOV 104 orientation at the first intermediate observation location 202A or otherwise released to the control of the user to be oriented in any orientation the user wishes. In one embodiment, this may be referred to as the POI 108 capturing the FOV 104 and then releasing it. The duration for which the FOV 104 "lingers" in the orientation towards the POI 108 may be implementation dependent, e.g. the duration may be a function of the rate of simulated travel, the number of intermediate observation locations, a guideline for avoiding user annoyance, a guideline for substantially ensuring that the user has perceived the POI 108, a function of the amount of compensation paid by the sponsor of the POI 108, or a combination thereof.

Figure 3:
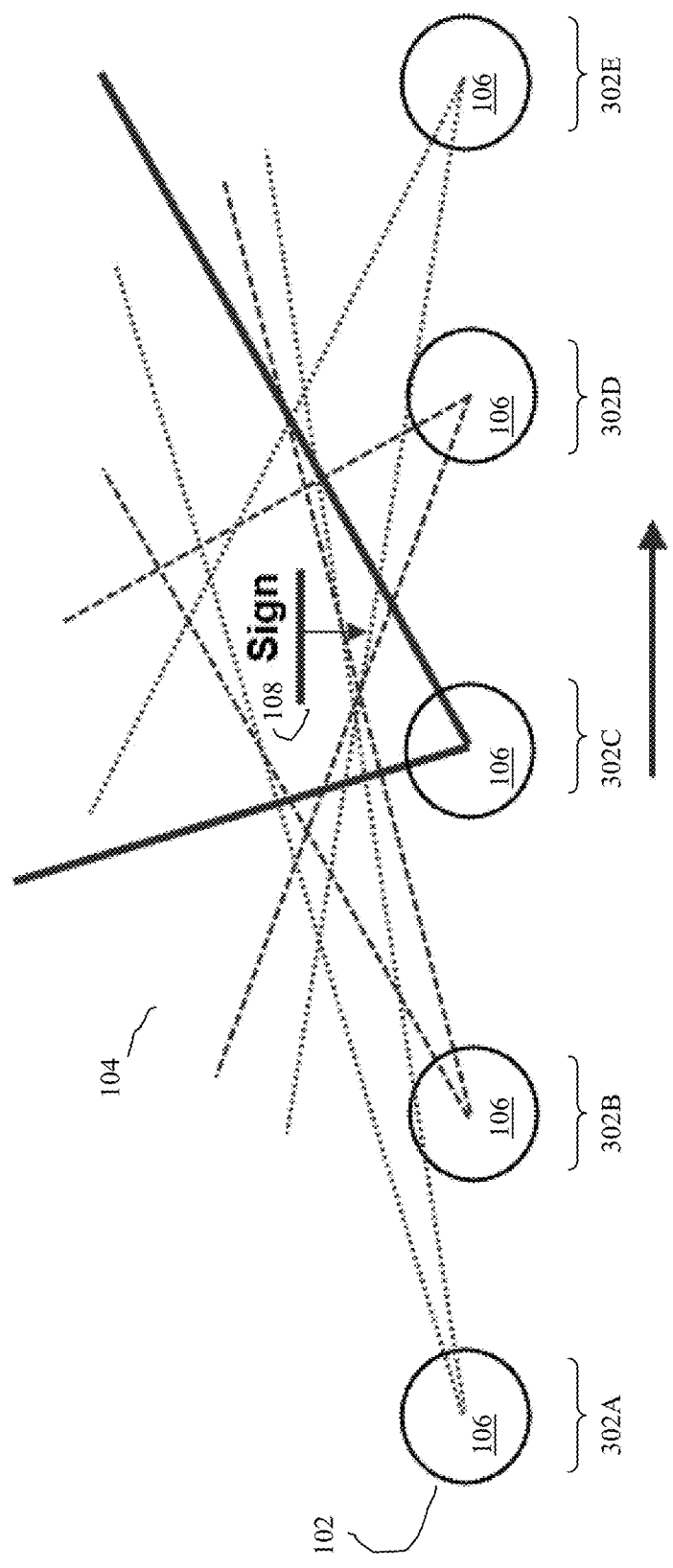
FIG. 3 is a diagram depicting exemplary variation of a simulated field of view of an observer as the observer travels by a point of interest according to one embodiment.

FIG. 3 is a diagram depicting an exemplary variation of a simulated field of view 104 of an observer 106 as travel of the observer 106 is simulated traveling by a point of interest 108 according to one embodiment. In the depicted example of FIG. 3, the FOV 104 of the observer 106 is reoriented toward the POI 108 as described above. Further, as the observer 106 approaches the POI 108, i.e. the observer 106 transitions from intermediate observation locations 302A to 302B to 302C, the width of the FOV 104 is increased, via the selection and/or modification of one or more appropriate images from the image data set as described above, so as to increase perceptibility and/or visibility of the POI 108, e.g. to ensure that the representation of the POI 108 displayed within the FOV 104 covers/consumes a certain portion/area thereof, such as 50%, which may be referred to as the coverage ratio. Alternatively, the focal length of the FOV 104 may be altered, or present the appearance thereof, such as by selecting images having the appropriate focal length, or otherwise modifying images from the image data set, so as to appear to zoom in on the POI 108 or otherwise vary the percentage of the visible region represented within the FOV 104. It will be appreciated that the variation in width or zoom of the FOV 104 may be utilized as an additional feature of any of the embodiments discussed herein. Further, as depicted in FIG. 3, rather than release the FOV 104 as the observer 106 passes by, i.e. the observer 106 transitions from intermediate observation locations 302C to 302D to 302E, as was shown in FIG. 2, the FOV 104 may continue to linger, i.e. maintain an orientation toward the POI 108 at each successive intermediate observation location. It will be appreciated that various combinations of the features depicted in the examples shown in FIGS. 1B, 2 and 3 may be combined. For example, while the FOV 104 of the observer 106 may be oriented toward the POI 108 as the observer 106 approaches, passes and retreats from the POI 108, at a certain distance of the observer 106 from the POI 108, not shown in the Figure, the FOV 104 may be released and returned, e.g. gradually or immediately, to an orientation in the direction of travel or other user selected orientation, or otherwise released to user's control.

Figure 4:
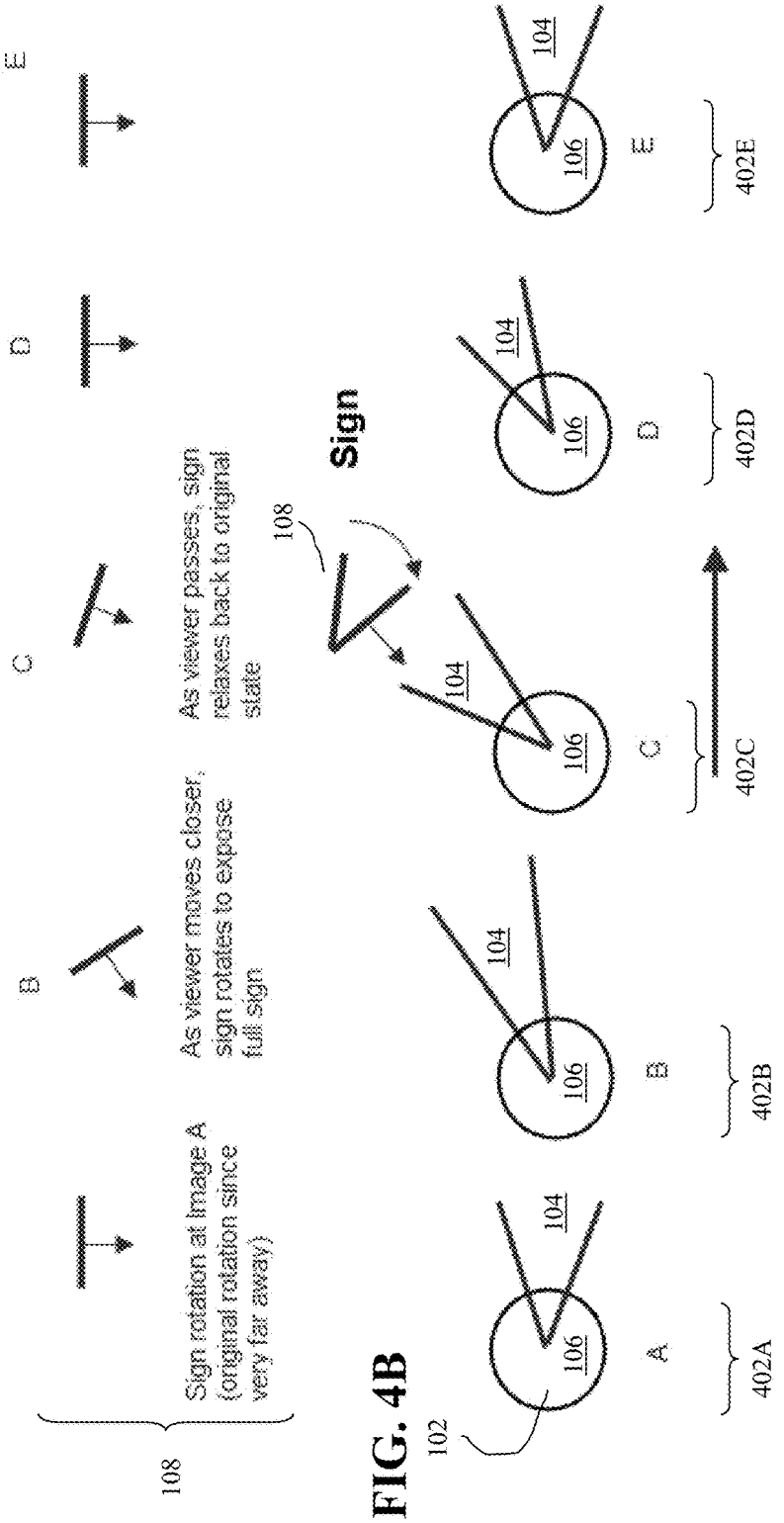
FIG. 4A is a diagram depicting exemplary variation in the presentation of a point of interest.
FIG. 4B is a diagram depicting exemplary variation of a simulated field of view of an observer as the observer travels by the point of interest according to one embodiment.

FIG. 4A depicts exemplary sequential variation of the POI 108 as presented in the FOV 104. In one embodiment, the images in the image data set are altered so as to alter the presentation of the POI 108 therein. For example, in one implementation, an image containing the POI 108 may be altered to include a polygon over which the image of the POI 108 is overlaid. In an alternate implementation, the entire original image, or portion thereof, may be warped, i.e. the image pixels may be warped based on FOV 104 direction and the normal angle of the POI 108. The navigation system/application may then manipulate the polygon, as will be described, whereby those manipulations are then applied to the overlaid image of the POI 108. Alterations of the representation of the POI 108 may include altering its apparent orientation, as shown by the sequence of FIG. 4A showing an exemplary change in orientation of the POI 108 and in FIG. 4B, with respect to its geographic location and/or the current or anticipated intermediate observation location 402A-E of the observer 106. For example, where the normal of the advertising-bearing surface of the POI 108 is perpendicular, or substantially close thereto, to the direction of simulated travel of the observer 106 along the route 102, i.e. from one intermediate observation location to the next 402A-E, the apparent perspective of the POI 108 as appearing in the FOV 104 may make perception difficult by the user, such as due to distortion. Accordingly, as shown in FIGS. 4A and 4B, the apparent orientation of the POI 108 as presented, may be altered, e.g. rotated, translated, pivoted, elevated/declinated, raised/lowered, etc. to adjust the apparent perspective to reduce distortion, minimize perspective scaling and/or improve visual perceptibility of the POI 108 within the FOV 104. Alternatively, or in addition thereto, other enhancement or augmentation of the presentation of the POI 108 may be performed such as alternation of size or scale of the POI 108 as presented, alteration of the coloring, and/or alteration of the lighting and/or focus, such as by brightening the presentation of the POI 108 and/or darkening or blurring the remainder of the scene depicted in the FOV 104 so as to give the appearance of accentuating, highlighting or spotlighting the POI 108. Alternatively, or in addition thereto, the presentation of the POI 108 may be animated so as to, for example, provide the illusion of the POI 108 changing, popping out or otherwise moving relative to the remainder of the scene depicted in the FOV 104.

Figure 6:
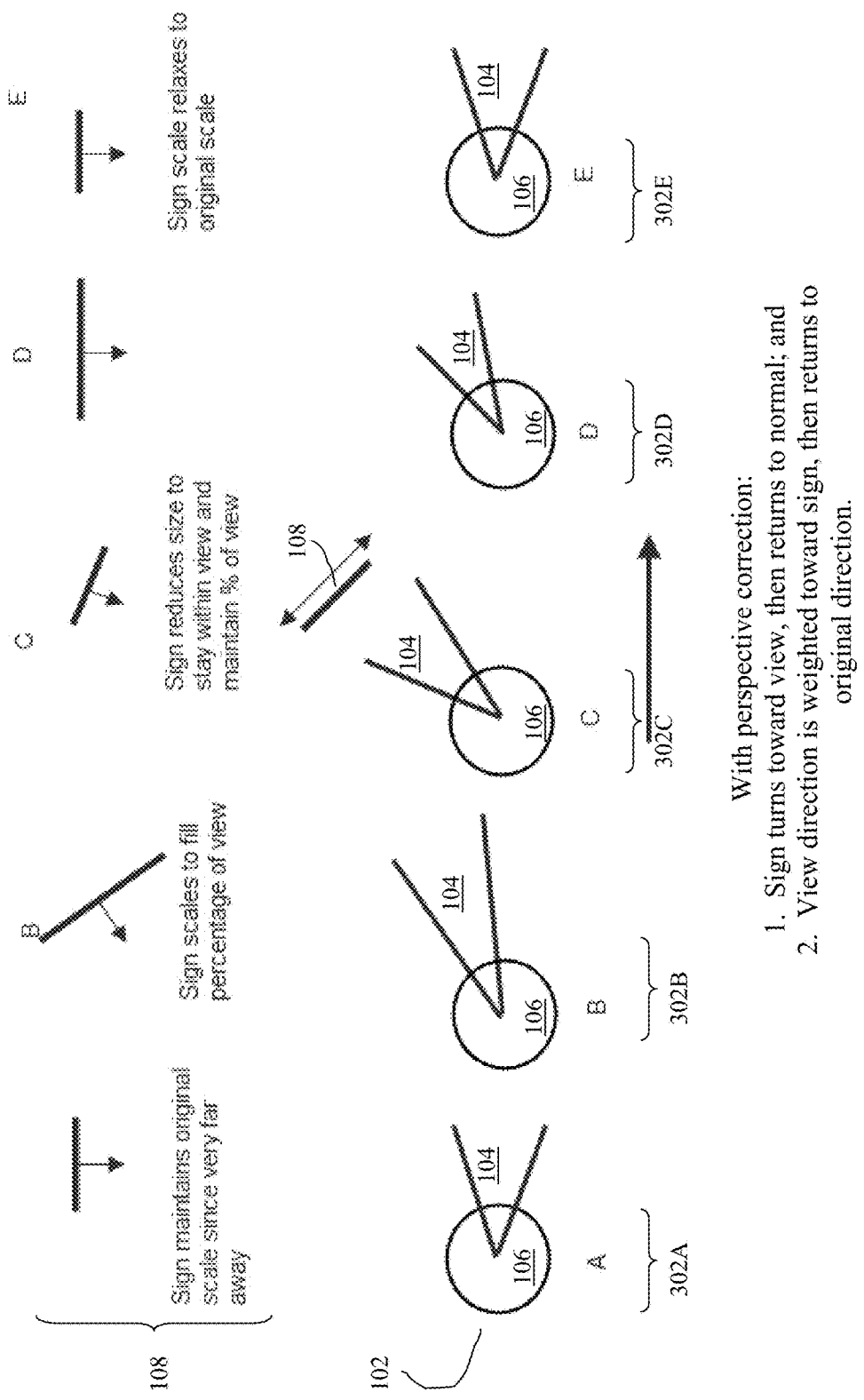
FIG. 6 is a diagram depicting exemplary variation of a simulated field of view of an observer and/or of a point of interest as the observer travels by the point of interest according to one embodiment.

FIG. 4B is a diagram depicting exemplary variation of a simulated field of view 104 of an observer 106 as the observer 106 travels by the point of interest 108 according to one embodiment. In the depicted example of FIG. 4B, the FOV 104 of the observer 106 is reoriented toward the POI 108 as described above. Further, as the observer 106 approaches the POI 108, i.e. the observer 106 transitions from intermediate observation locations 402A to 402B to 402C, the orientation of the POI 108 as presented in the FOV 104 is altered to begin to align the normal of the advertising-bearing surface of the POI 108 with the orientation of the FOV 104, i.e. give the appearance thereof, at each intermediate observation location 402A-C. As the observer 106 reaches the closest intermediate observation location 402C to the POI 108, the alignment of the POI 108 converges with the alignment of the FOV 104 thereby the visibility/perceptibility of the presentation of the POI 108 is substantially optimized. Subsequently, the alignment of the FOV 104 and POI 108 may be caused diverge as the observer 106 moves away from the POI 108. It will be appreciated that by altering both the orientation of the FOV 104 and the orientation of the representation of the POI 108, the degree to which either, or both, orientations must be altered to achieve the goal described herein of drawing attention to the POI 108 may be minimized. As the observer 106 subsequently passes by and retreats from the POI 108, the orientation of the presentation of the POI 108 is relaxed to its original/actual orientation. In addition, the FOV 104 orientation may then be relaxed back to an orientation along the direction of travel or other user selected orientation. Alternatively, as discussed above, the FOV 104 orientation and/or the orientation of the presented POI 108 may be maintained toward each other as the observer 106 passes by and relaxed at a later subsequent intermediate observation position not shown. It will be appreciated that other characteristics of the presentation of the POI 108, such as those characteristics discussed above, may be altered as the observer 106 approaches instead or in addition to the orientation thereof, including, as shown in FIG. 6, the size and/or scale of the presented POI 108, the lighting or coloring. Further, in addition to reorienting the FOV 104 toward the POI 108, the focal length, lighting or other attributes of the FOV 104 may also be altered.

Figure 8:
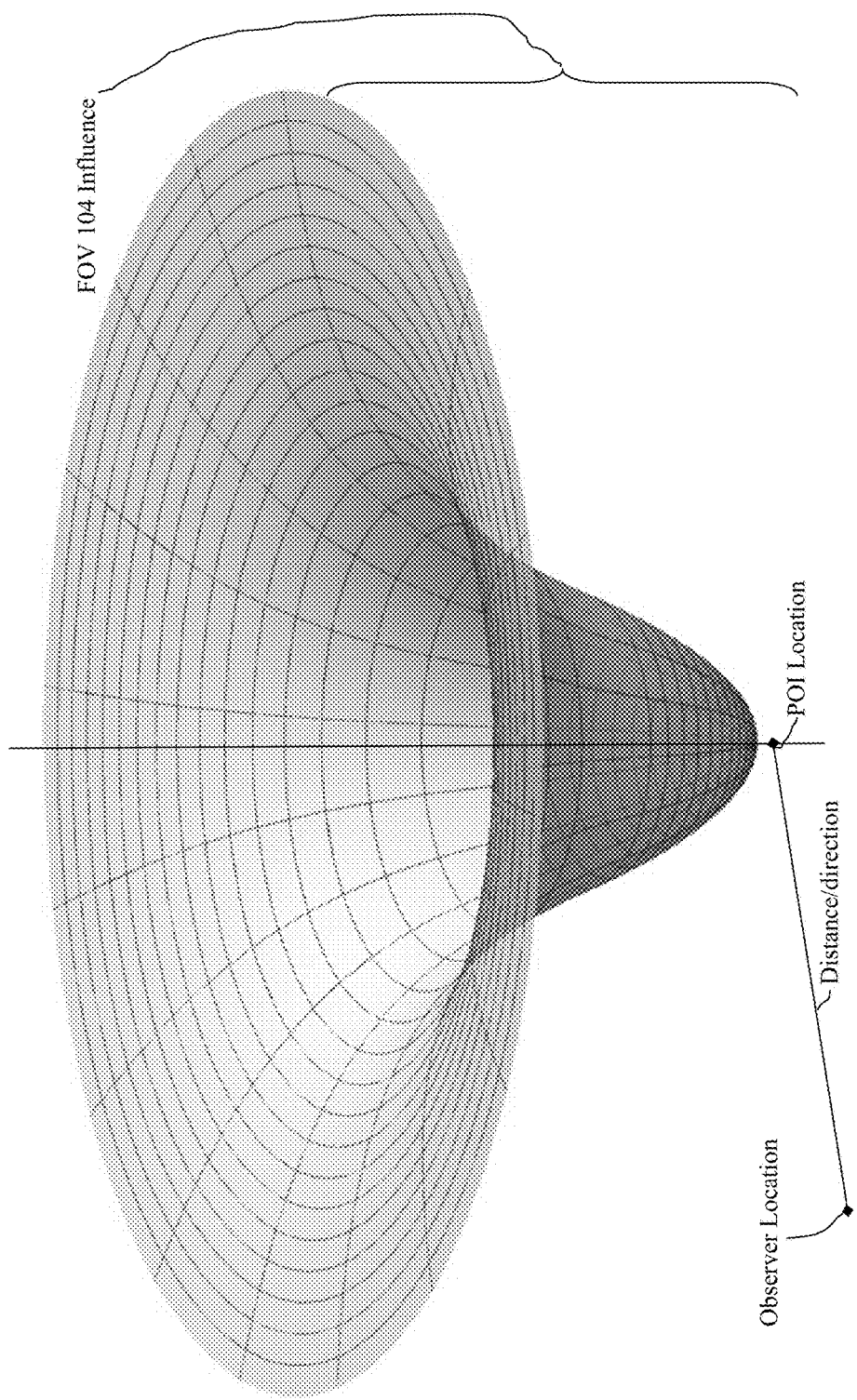
FIG. 8 is a representation of an exemplary function by which an orientation of a simulated observer of a point of interest may be adjusted with respect to proximity thereto for deriving the simulated field of view of the system of FIG. 11.
Figure 9:
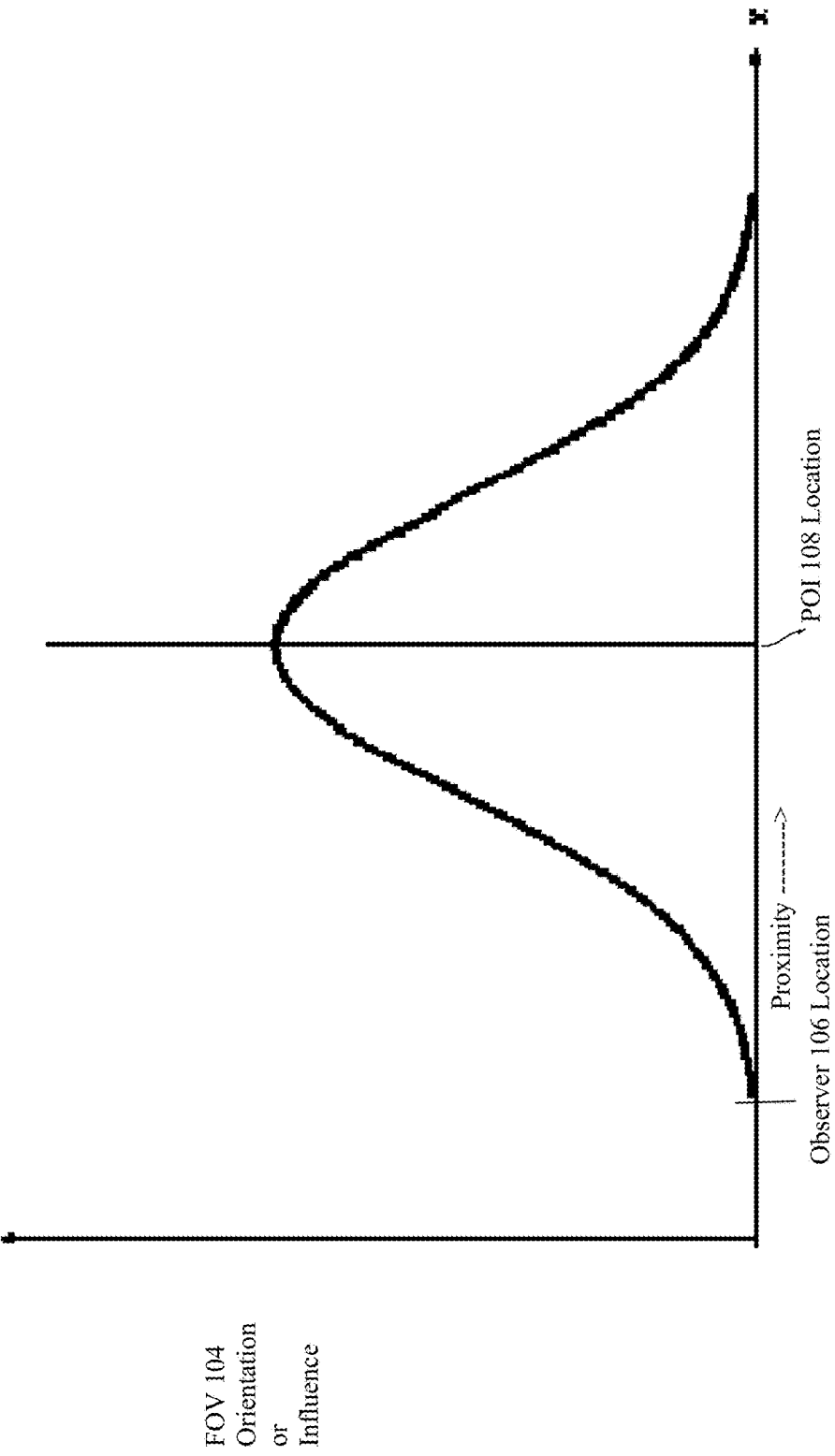
FIG. 9 is a representation of an alternate function by which an orientation of a simulated observer of a point of interest may be adjusted with respect to proximity thereto for deriving the simulated field of view of the system of FIG. 11.

As discussed above, to provide for a more user friendly presentation and/or to otherwise provide a temporal aspect to the alteration of the POI 108 presentation and/or FOV 104, such alterations may be gradually introduced into the virtual simulation or simulated navigation, e.g. as a function of time, such as loiter time, travel time, and/or distance, such as proximity to a given POI 108, or a derivate, e.g. rate of change, thereof. FIGS. 8 and 9 are representation of exemplary functions by which an orientation of a simulated observer 106 of a POI 108 may be adjusted with respect to proximity thereto, e.g. from one intermediate observation position to another, for deriving the simulated FOV 104 of the system of FIG. 11. In particular, in one embodiment, a given POI 108 may be characterized as having a gravitational, magnetic, attractive, resistive, sticky and/or drag characteristic, influence or effect on the FOV 104 as a function of the proximity of the observer 106 to the POI 108, or in the case of a static observer 106, duration or loiter time within a specified proximity to the POI 108. In one embodiment, the function may create a zone or region of influence and may be implemented so as to override user selection of a particular FOV 104 when the observer location is within the defined zone/region. Alternatively, the function may be implemented as a bias or influence which, absent a one time or continuous counter-action by the user to control the FOV 104 orientation, will alter the FOV 104 as described when the observer location is within the zone/region. It will be appreciated that there may be numerous linear and/or exponential functions, or derivations thereof, which may used to characterize a zone/region of influence within which is caused gradual or incremental alteration of the presentation of the POI 108 and/or the orientation of the FOV 104, including compound functions which implement a constant or accelerating alteration thereto and/or a continuous/lingering view and/or a catch and release as described. Further, each POI 108 within a given geographic locality may be characterized by the same or a different function wherein the functions/influence zones of conflicting or interfering POI's 108 along a given route 102 may be evaluated or otherwise resolved, such as at the time of the initial presentation of the FOV 104 or at the time of simulated travel, as to the effect each will have on the FOV 104 of the observer 106. In one embodiment, the "strength" or pull of a given function, i.e. the force that the POI 108 may exert on the FOV 104, may be determined based on the amount of compensation provided by the sponsor of the associated POI 108. Alternatively, or in addition thereto, inverse functions to those described above which repel the FOV 104 from orienting toward the POI 108, as opposed to attracting it, may be implemented as was described above. Such functions may be used to direct the FOV 104 away from uninteresting POI's 108 or may be used so as to allow a sponsor to direct the FOV 104 away from a competitor's POI 108, such as in exchange for compensation to the operator of the navigation system/application and/or the user thereof.

Figure 10:
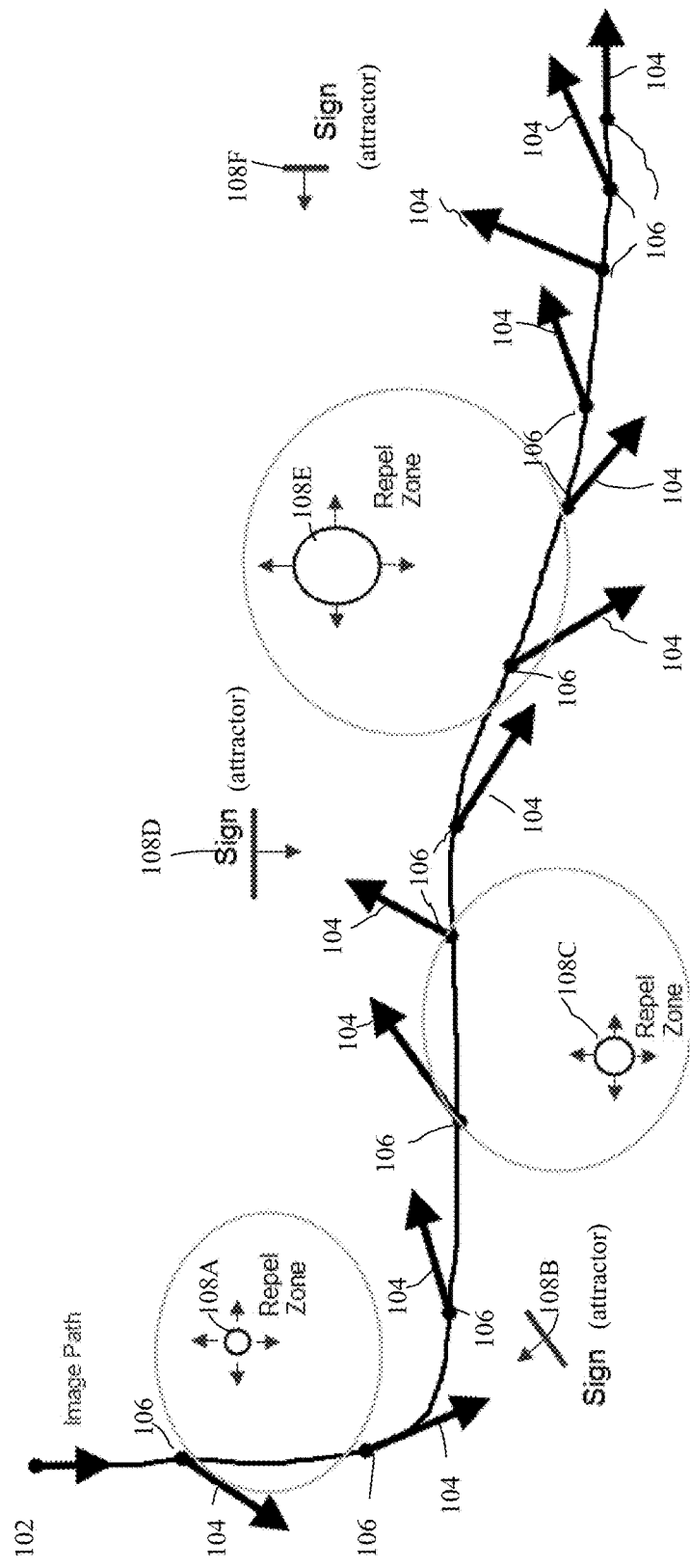
FIG. 10 is a diagram depicting exemplary variation of a simulated field of view of an observer and/or of a point of interest as the observer travels by multiple points of interest according to one embodiment.

FIG. 10 is a diagram depicting exemplary variation of a simulated field of view 104 of an observer 106 and/or of presentation of a point of interest 108 as travel of the observer 106 is simulated along a route 12 which travels proximate to multiple points of interest 108A-E according to one embodiment. As shown POI's 108A-F may be characterized by different attraction or repulsion functions, as described above. Accordingly, as the progression of navigating the route is simulated, the orientation of the FOV 104 is altered to orient toward or away from the various POI's 108A-E as they are approached, passed and retreated from. While not shown, the presentation of each POI 108A-E may also be altered as described above as the navigation progresses. As can be seen then, the FOV 104 is constantly gravitating toward or away from a successive POI's, and the POI's may similarly gravitate toward present simulated position, as the simulated travel progresses along the route 102, selectively directing the user's attention toward or away from those POI's 108A-E.

Figure 11:
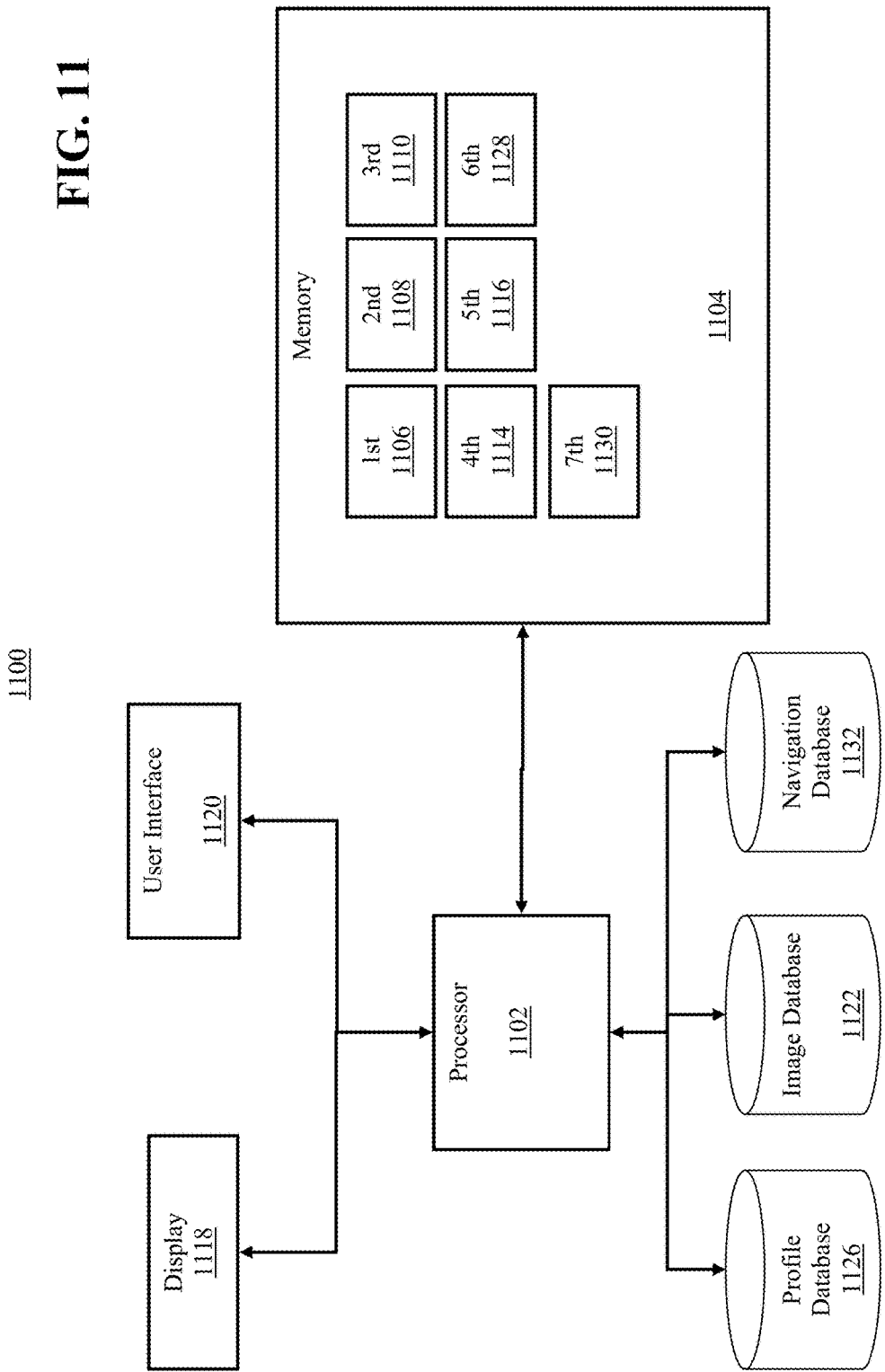
FIG. 11 illustrates a block diagram of a system, according to one embodiment, for manipulating a user's attention with respect to a point of interest represented in a simulated field of view of a geographic locality during simulation of travel between locations therein.

FIG. 11 illustrates a block diagram of a system 1100, according to one embodiment, for manipulating a user's attention with respect to at least one point of interest 108, such as an advertisement, represented in a simulated field of view 104, as described above, of a geographic locality during simulation of travel between locations therein. The system 1100 includes a processor 1102 and a memory 1104 coupled therewith, such as the processor 1302 and memory 1304 described with respect to FIG. 13.

The system 1100 further includes computer program logic 1106, which may be referred to herein as first computer program logic 1106, stored in the memory 1104 and executable by the processor 1102 to cause the processor 1102 to receive, from a user (not shown) via a user interface 1112 coupled with the processor 1102, a request to present a simulated field of view of a particular geographic location or otherwise simulate travel via a route, such as the route 102 described above, from a starting location of a plurality of locations within the geographic locality toward a destination location of the plurality of locations within the geographic locality. The route may include a plurality of intermediate observation locations, such as the intermediate observation locations 110A-C, 202A-E, 302A-E, 402A-E, etc. described above, within the geographic locality sequentially via which the travel is to be simulated. It will be appreciated that the received request may comprise a specification, implied or explicit, of the geographic locality, the starting location, the destination location, or other desired navigation parameters, or a combination thereof and may be specified prior to navigation and/or prior or subsequent to virtual presentation of a portion of the geographic locality. In one embodiment, the user may specify the desired navigation parameters via the user interface 1120 by selecting, such as with a user interface device, e.g. a mouse, touch screen or other pointing device, a location or indicator thereof, such as a directional control, within the presented field of view indicative of a request to navigate to the selected location or in the selected direction from the present location represented therein. As will be described below, the system 1100 may be implemented as stand-alone, network or server based navigation system or application or as a feature thereof, and may further be implemented as a device, such as handheld device or as a service delivered thereto via a public and/or private wired and/or wireless network, such as the network 1320 described below with respect to FIG. 13. In one embodiment, the user interface 1112 comprises a web based user interface delivered to or otherwise presented via a client application, such as a web browser or proprietary interface, and/or device via the Internet. In one embodiment, the processor 1102 is coupled with a navigation/map database 1132, which may be stored in the memory 1104, separate therefrom or otherwise stored local or remote with respect to the system 1100 such as in the storage 1306 described below with respect to FIG. 13, comprising navigation/map data for the given geographic locality which permits the presentation of geographic and cartographic information as well as computation and presentation of navigable routes, such as by car, bicycle, public transportation and/or walking, between locations within the locality. The navigation/map database 1132 may further include data regarding or otherwise characterizing one or more POI's 108 located within the locality. It will be appreciated that a separate POI database (not shown) may be provided and coupled with the processor 1102 which stores data relating to or describing various POI's 108 and may include sponsorship data, as described below, profile or other characteristics of the POI's 108, images, icons, stock graphics or art, URL's or other contact information for the owner or sponsor of the POI 108, etc.

In one embodiment, as was described above, the system 1100 includes an image database 1122, which may be stored in the memory 1104, separate therefrom, or otherwise stored local or remote with respect to the system 1100 such as in the storage 1306 described below with respect to FIG. 13, having stored therein a plurality of images, such as panoramic images, each of which is representative of a portion of the geographic locality as viewed from a particular location of the plurality of locations therein.

The system 1100 further includes computer program logic 1108, which may be referred to herein as second computer program logic 1108 and, depending upon the implementation, may be part of the computer program logic discussed above or otherwise coupled therewith, stored in the memory 1104 and executable by the processor 1102 to cause the processor 1102 to identify the POI(s) 108, e.g. the POI(s) 108 with respect to which the user's attention will be manipulated, each POI 108 being located at a POI location of a plurality of locations within the geographic locality. In one embodiment, POI's 108 are identified based on their proximity to the simulated navigation route and/or whether or on not they are located within the set of observable locations of any of the intermediate observation locations. Further, in one embodiment POI's 108 may be further identified as being associated with a sponsor entity which may have provided compensation in exchange for the identification of their associated POI 108. Data representative of this association may be stored in the navigation/map database 1132 in conjunction with the POI 108 information such as a store image, icon, URL or other contact information which may be displayed in the simulated FOV 104 proximate to the representation of the POI 108. In the case of a URL, email, telephone number or other contact information, the presentation thereof within the FOV 104 may be interactive allowing a user to select or otherwise activate the presentation to initiate contact with sponsor or POI 108 owner, such as via email, a web browser, by SMS/MMS or by telephone call. Alternatively, or in addition thereto, POI's 108 may be identified based on a profile of the user which may define user preferences, interests or the like. The POI 108 may be identified by associating or correlating one or more characteristics or parameters of the POI 108, as may be stored in the navigation/map database 1132, such as location, sponsor, FOV orientation altering function, etc. with the simulated navigation route and/or the current position thereon of the simulated navigation, the user profile, or a combination thereof.

The system 1100 further includes computer program logic 1110, which may be referred to as third computer program logic 1110 and, depending upon the implementation, may be part of the computer program logic discussed above or otherwise coupled therewith, stored in the memory 1104 and executable by the processor 1102 to cause the processor 1102 to present on a display 1118, such as a computer monitor or built-in display screen, coupled therewith, a simulated field of view 104 comprising a first representation of a first subset of observable locations of a first set of observable locations within the geographic locality. The first set of observable locations includes those locations of the plurality of locations within the geographic locality which would be visible to an observer 106 oriented in any orientation and located at a first intermediate observation location of the plurality of intermediate observation locations of the route 102 wherein the first subset of observable locations comprising those locations of the first set of observable locations which would be visible to the observer oriented in a first orientation and located at the first intermediate observation location. In one embodiment, the first representation may include one or more images, or aggregates/composites thereof, such as panoramic images, retrieved from the image database 1122 based on a correlation between the first intermediate observation location, the first orientation and data characterizing the location and orientation from which the images were captured as may be stored in conjunction with the images in the image database 1122. It will be appreciated that the first orientation may include an orientation directly or indirectly specified by the user and may or may not be in the direction of travel. Further the first orientation may be an orientation computed by the system 1100 as described herein when the observer 106 of the simulated navigation was located at a prior intermediate observation location, i.e. the first orientation is actually the third orientation, described below, from a prior iteration of the system 1100 operation.

The system 1100 further includes computer program logic 1112, which may be referred to as fourth computer program logic 1112 and, depending upon the implementation, may be part of the computer program logic discussed above or otherwise coupled therewith, stored in the memory 1104 and executable by the processor 1102 to cause the processor 1102 to compute, based on a relationship between the POI location and a second, e.g. subsequent or next, intermediate observation location, a second orientation of the observer located at the second intermediate observation location whereby, based thereon, a second subset of observable locations of the second set of observable locations would be visible thereto. The second set of observable locations includes those locations of the plurality of locations of the geographic locality which would be visible to the observer oriented in any orientation and located at a second intermediate observation location of the plurality of intermediate observation locations of the route to which travel of the observer from the first intermediate observation location is to be simulated. In one embodiment, the second orientation is different from an orientation aligned with the direction of travel and may be further different from a user selected orientation. That is, the first orientation is different from both a third orientation, oriented in a direction of travel from the first intermediate observation location to the second intermediate observation location, and a fourth orientation, oriented in a direction of travel from the second intermediate observation location to a third intermediate observation location of the plurality of intermediate observation locations of the route to which travel of the observer from the second intermediate observation location is to be simulated. The second orientation may be a direction from the second observation location towards, or alternatively, away from the POI location.

In one embodiment, the computer program logic 1108 is further executable by the processor 1102 to cause the processor 1102 to identify the POI 108 based on a profile 1126, such as may be stored in a profile database 1124, which may be stored in the memory 1104, separate therefrom or otherwise stored local or remote with respect to the system 1100 such as in the storage 1306 described below with respect to FIG. 13, of the user as was described above. Based thereon, the computer program logic 1114 is further executable by the processor 1102 to cause the processor 1102 to compute the second orientation to be toward, or otherwise in the direction of, the POI 108. Alternatively, or in addition thereto, the computer program logic 1114 may be further executable by the processor 1102 to cause the processor 1102 to compute the second orientation to be away from, or otherwise not in the direction of, the POI 108. Whether the orientation is directed toward or away from the POI 108 may be dependent upon the characteristics of the POI 108, the user profile, whether a sponsor of the POI 108 has provided compensation to the operator of the system and/or the user, or a combination thereof.

The system 1100 further includes computer program logic 1116, which may be referred to as fifth computer program logic 1114 and, depending upon the implementation, may be part of the computer program logic discussed above or otherwise coupled therewith, stored in the memory 1104 and executable by the processor 1102 to cause the processor

1102 to present on the display 1118 coupled therewith upon simulated arrival at the second intermediate observation location, the simulated field of view comprising a second representation of the second subset of observable locations, e.g. including appropriate selected and/or modified images or aggregates/composites, e.g. panoramic images, thereof from the image database 1122. Thereby, the user is presented with an updated simulated field of view oriented as described above. It will be appreciated that display of the second representation may coincide with a audible or otherwise annunciated indicator played over an audio speaker (not shown) coupled with the system 1100.

In one embodiment, the computer program logic 1108 may be further executable by the processor 1102 to cause the processor 1102 to account for receipt of compensation from an entity, e.g. a sponsor, associated with the POI 108 and, based thereon, the computer program logic 1114 may be further executable by the processor 1102 to cause the processor 1102 to compute the second orientation to be toward the POI 108.

In one embodiment, the computer program logic 1114, described above, may be further executable by the processor 1102 to cause the processor 1102 to select one or more images from the image database 1122 which most closely comprises the second subset of observable locations over the other images stored in the image database 1122, where the second representation includes the selected image(s).

In one embodiment, the system 1100 may further include computer program logic 1128, which may be referred to as sixth computer program logic 1128 and, depending upon the implementation, may be part of the computer program logic discussed above or otherwise coupled therewith, stored in the memory 1104 and executable by the processor 1102 to cause the processor 1102 to determine, that, for a third subset of observable locations of the second set of observable locations which includes those locations of the second set of observable locations which would be visible to the observer 106 located at the second intermediate observation location and oriented in the fourth orientation, the third subset of observable locations does not include the POI location. Based thereon, the fourth computer program logic 1114 may be further executable by the processor 1102 to cause the processor 1102 to compute the second orientation such that the second subset of observable locations includes the POI location.

In one embodiment, the extent to which the second orientation is computed to be toward the POI location is a function of the proximity of the second intermediate observation location to the POI location. The extent to which the second orientation is computed to be toward the POI location may further be a function of a difference between the third and fourth orientations and a fifth orientation oriented from the second observation location directly toward the POI location.

In one embodiment, the second orientation may be computed to be toward the POI location when the second intermediate observation location is geographically closer to the POI location than the first intermediate observation location and wherein the second orientation is computed to be away from the POI location when the second intermediate observation location is geographically further from the POI location than the first intermediate observation location.

In one embodiment, the system 1100 may further include computer program logic 1130, which may be referred to as seventh computer program logic 1130 and, depending upon the implementation, may be part of the computer program logic discussed above or otherwise coupled therewith, stored in the memory 1104 and executable by the processor 1102 to cause the processor 1102 to augment a representation of the POI within the second representation so as to visually distinguish the representation from a remainder of the second representation.

In one embodiment, the system 1100 further includes computer program logic 1128, which may be referred to as, or be part of the, sixth computer program logic 1114 and, depending upon the implementation, may be part of the computer program logic discussed above or otherwise coupled therewith, stored in the memory 1104 and executable by the processor 1102 to cause the processor 1102 to determine, that, for a third subset of observable locations of the second set of observable locations which includes those locations of the second set of observable locations which would be visible to the observer 106 located at the second intermediate observation location and oriented in the fourth orientation, the third subset of observable locations includes the POI location. Based thereon, the fourth computer program logic 1114 may be further executable by the processor 1102 to cause the processor 1102 to compute the second orientation such that the second subset of observable locations does not include the POI location. Alternatively, or in addition thereto, the sixth computer program logic 1128 may be executable by the processor 1102 to cause the processor 1102 to determine that the second set of observable locations does not include the POI location. Based thereon, the fourth computer program logic 1116 may be further executable by the processor 1102 to alter the second representation to include a representation of the POI 108 as if the POI location were included in the second subset of observable locations.

In one embodiment, the POI 108 is further characterized by a POI orientation, as was described above. Accordingly, the fourth computer program logic 1116 may be further executable by the processor 1102 to determine whether the POI orientation is oriented toward the second observation location and, if the POI orientation is not oriented toward the second observation location, modify a perceived orientation of a representation of the POI 108 as presented within the simulated field of view so as to appear oriented toward the second observation location or otherwise increase optical perceptibility, minimize perspective scaling and/or reduce optical distortion of the representation of the POI 108 to the user. In one embodiment, the fourth computer program logic 1116 may be further executable by the processor 1102 to cause the processor 1102 to generate a representation of a polygon in the simulated field of view 104 so as to appear located at the POI location and overlay the representation of the POI 108 over the polygon, modify a perspective of the polygon with respect to the simulated field of view and apply similar modifications to the representation of the POI 108. It will be appreciated that there may be other methods of modifying an image to alter a representation of a POI 108 therein in accordance with the disclosed embodiments.

In one embodiment, the fourth computer program logic 1114 may be further executable by the processor 1102 to cause the processor 1102 to minimize a difference between the second and fourth orientations of the simulated field of view by adjusting the orientation of the representation of the POI 108.

In an alternative embodiment, the system 1100 for manipulating a user's attention with respect to a point of interest represented in a simulated field of view of a geographic locality during simulation of travel between locations therein may include computer program logic stored in the memory 1104, which may be referred to as first computer program logic and may be the same as or different from the first computer program logic 1106 described above, and executable by the processor 1102 to cause the processor 1102 to receive, from a user via a user interface 1120 coupled with the processor 1102, a request, such as was described above, to simulate travel via a route from a starting location of a plurality of locations within the geographic locality toward a destination location of the plurality of locations within the geographic locality, the route comprising a plurality of intermediate observation locations within the geographic locality sequentially via which the travel is to be simulated.

The system 1100 may further include computer program logic stored in the memory 1104, which may be referred to as second computer program logic and may be the same as or different from the second computer program logic 1108 described above, and executable by the processor 1102 to cause the processor 1102 to identify the POI, the POI being located at a POI location of a plurality of locations within the geographic locality and further characterized by a POI orientation.

The system 1100 may further include computer program logic stored in the memory 1104, which may be referred to as third computer program logic and may be the same as or different from the third computer program logic 1110 described above, and executable by the processor 1102 to cause the processor 1102 to present, on a display coupled therewith, a simulated field of view comprising a first representation of a first subset of observable locations of a first set of observable locations within the geographic locality, the first set of observable locations comprising those locations of the plurality of locations within the geographic locality which would be visible to an observer oriented in any orientation and located at a first intermediate observation location of the plurality of intermediate observation locations of the route, the first subset of observable locations comprising those locations of the first set of observable locations which would be visible to an observer oriented in a first orientation and located at the first intermediate observation location.

The system 1100 may further include computer program logic stored in the memory 1104, which may be referred to as fourth computer program logic and may be the same as or different from the fourth computer program logic 1112 described above, and executable by the processor 1102 to cause the processor 1102 to compute, upon simulated arrival at a second intermediate observation location of the plurality of intermediate observation locations and a second orientation there at and, based on a relationship between the POI location of the identified POI and the second intermediate observation location, whether the POI location is within a second subset of observable locations of a second set of observable locations within the geographic locality, the second set of observable locations comprising those locations of the plurality of locations within the geographic locality which would be visible to an observer oriented in any orientation and located at the second intermediate observation location of the plurality of intermediate observation locations of the route, the second subset of observable locations comprising those locations of the second set of observable locations which would be visible to an observer oriented in the second orientation and located at the second intermediate observation location, and further whether the POI orientation is oriented toward the second observation location, that the POI location is within the second subset of observable locations and the POI orientation is not oriented toward the second observation location, modify a perceived orientation of a representation of the POI as presented within the simulated field of view so as to appear oriented toward the second observation location. It will be appreciated that, as described above, the orientation of the field of view may also be altered so as to include the POI location or otherwise augment its visibility therein.

The system 1100 may further include computer program logic stored in the memory 1104, which may be referred to as fifth computer program logic and may be the same as or different from the fifth computer program logic 1114 described above, and executable by the processor 1102 to cause the processor 1102 to present, on the display coupled therewith, the simulated field of view comprising a second representation of the second subset of observable locations and including the modified representation of the POI.

In one embodiment of the system 1100 described above, the computer program logic described above may be further executable by the processor 1102 to cause the processor 1102 to modify the perceived orientation of the representation of the POI so as to increase visual perceptibility of the representation of the POI to the user.

In one embodiment of the system 1100 described above, the computer program logic described above may be further executable by the processor 1102 to cause the processor 1102 to generate a representation of a polygon in the simulated field of view so as to appear located at the POI location and overlay the representation of the POI over the polygon, modify a perspective of the polygon with respect to the simulated field of view and apply similar modifications to the representation of the POI.

In one embodiment of the system 1100 described above, the computer program logic described above may be further executable by the processor 1102 to cause the processor 1102 to minimize a difference between the POI orientation and the second orientations by adjusting the orientation of the representation of the POI. In addition, as was described above, the orientation of the simulated field of view may also be altered.

Figure 12:
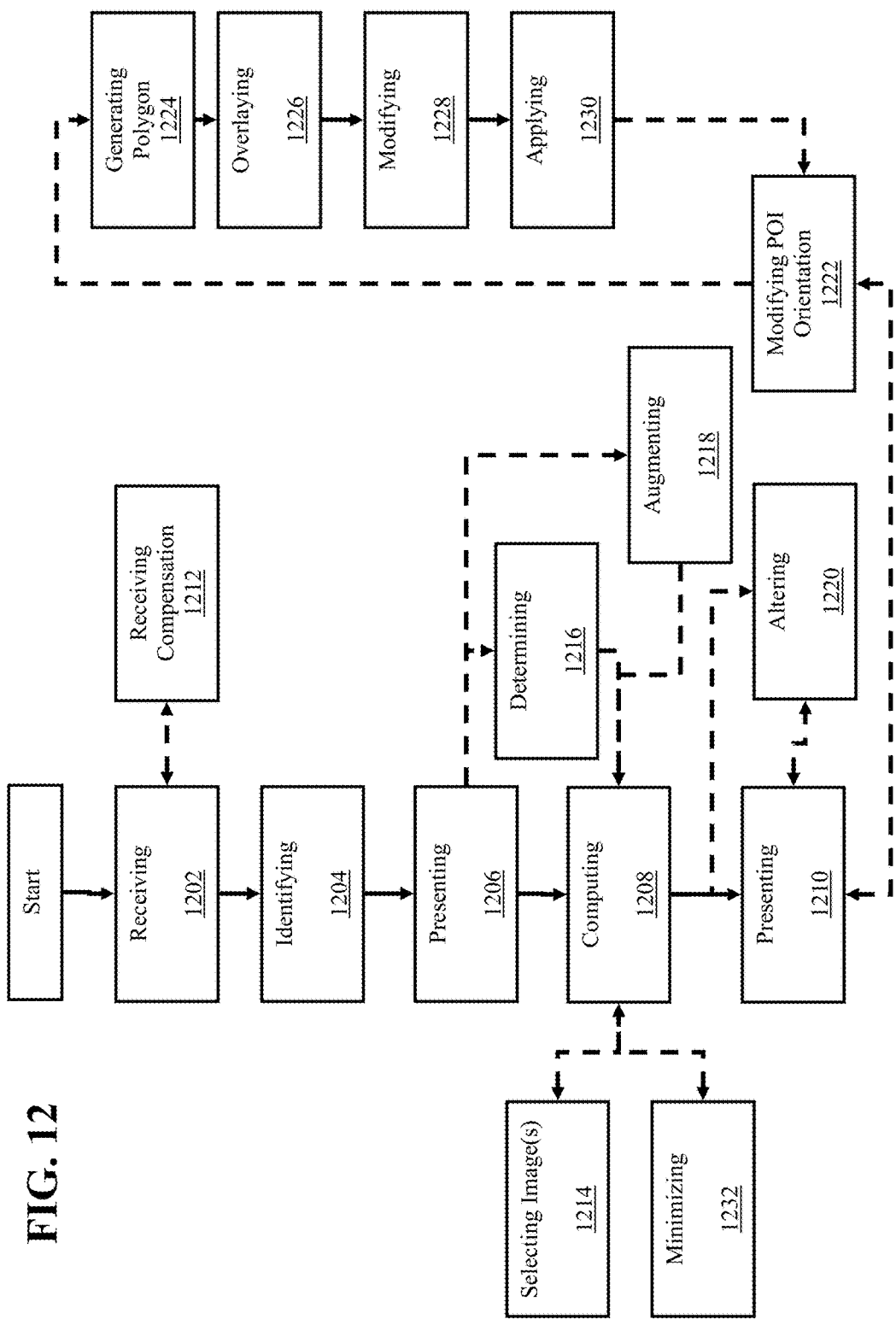
FIG. 12 is a flow chart showing operation of the system of FIG. A according to one embodiment.

FIG. 12 is a flow chart showing operation of the system 1100 of FIG. 11 according to one embodiment for manipulating a user's attention with respect to a point of interest represented in a simulated field of view of a geographic locality during simulation of travel between locations therein. The operation includes: receiving, from a user via a user interface 1120 coupled with a processor 1102, a request to simulate travel via a route from a starting location of a plurality of locations within the geographic locality toward a destination location of the plurality of locations within the geographic locality, the route comprising a plurality of intermediate observation locations within the geographic locality sequentially via which the travel is to be simulated [block 1202]; identifying, by the processor 1102, the POI 108, such as an advertisement or store front, the POI 108 being located at a POI location of a plurality of locations within the geographic locality [block 1204]; presenting, by the processor 1102 on a display 1118 coupled therewith, a simulated field of view 104 comprising a first representation of a first subset of observable locations of a first set of observable locations within the geographic locality, the first set of observable locations comprising those locations of the plurality of locations within the geographic locality which would be visible to an observer oriented in any orientation and located at a first intermediate observation location of the plurality of intermediate observation locations of the route, the first subset of observable locations comprising those locations of the first set of observable locations which would be visible to an observer oriented in a first orientation and located at the first intermediate observation location [block 1206]; computing, by the processor 1102 based on a relationship between the POI location of the identified POI 108 and the second intermediate observation location, a second orientation of the observer located at the second intermediate observation location, such as from the second intermediate observation location toward the POI location, whereby, based thereon, a second subset of observable locations of a second set of observable locations would be visible thereto, the second set of observable locations comprising those locations of the plurality of locations of the geographic locality which would be visible to the observer oriented in any orientation and located at a second intermediate observation location of the plurality of intermediate observation locations of the route to which travel of the observer from the first intermediate observation location is to be simulated, the second orientation being different from both a third orientation, oriented in a direction of travel from the first intermediate observation location to the second intermediate observation location, and a fourth orientation, oriented in a direction of travel from the second intermediate observation location to a third intermediate observation location of the plurality of intermediate observation locations of the route to which travel of the observer from the second intermediate observation location is to be simulated [block 1208]; and presenting, by the processor 1102 on the display 1118 coupled therewith upon simulated arrival at the second intermediate observation location, the simulated field of view comprising a second representation of the second subset of observable locations [block 1210].

The identifying may further include receiving compensation from an entity associated with the POI and, based thereon, the computing further comprises computing the second orientation to be toward the POI [block 1212].

The identifying may further include identifying the POI based on a profile of the user and, based thereon, the computing further comprises computing the second orientation to be toward the POI.

In one embodiment, the processor 1102 may be further coupled with an image database 1122 having stored therein a plurality of images, each of which is representative of a portion of the geographic locality as viewed from a particular location of the plurality of locations therein, and wherein the computing further comprising selecting an image from the image database which most closely comprises the second subset of observable locations over the other images stored in the image database, the presenting of the second representation comprising presentation of the selected image [block 1214].

The operation of the system 1100 may further include determining, by the processor, that, for a third subset of observable locations of the second set of observable locations which includes those locations of the second set of observable locations which would be visible to the observer located at the second intermediate observation location and oriented in the fourth orientation, the third subset of observable locations does, or alternatively, does not include the POI location [block 1216], and, based thereon, further computing, by the processor, the second orientation such that the second subset of observable locations does not include, or includes, respectively, the POI location. Wherein, if it is determined that the second set of observable locations does not include the POI location, the operation of the system 1100 may further include altering the second representation to include a representation of the POI as if the POI location were included in the second subset of observable locations [block 1220].

In one embodiment, the extent to which the second orientation is computed to be toward the POI location may be a function of the proximity of the second intermediate observation location to the POI location and may further be a function of a difference between the third and fourth orientations and a fifth orientation oriented from the second observation location directly toward the POI location.

In one embodiment, the second orientation may be computed to be more toward the POI location than the first orientation when the second intermediate observation location is geographically closer to the POI location than the first intermediate observation location and wherein the second orientation is computed to be more away from the POI location than the first orientation when the second intermediate observation location is geographically further from the POI location than the first intermediate observation location.

The operation of the system 1100 may further include augmenting a representation of the POI within the second representation so as to visually distinguish the representation from a remainder of the second representation [block 1218].

In one embodiment, the POI 108 may be further characterized by a POI orientation, the presenting of the simulated field of view comprising the second representation further comprising determining whether the POI orientation is oriented toward the second observation location and, if the POI orientation is not oriented toward the second observation location, modifying a perceived orientation of a representation of the POI 108 as presented within the simulated field of view so as to appear oriented toward the second observation location [block 1222]. In one embodiment, the modifying further comprises modifying the perceived orientation of the representation of the POI 108 so as to increase visual perceptibility of the representation of the POI 108 to the user. In one embodiment, the modifying further includes generating a representation of a polygon in the simulated field of view so as to appear located at the POI location [block 1224] and overlaying the representation of the POI over the polygon [block 1226], modifying a perspective of the polygon with respect to the simulated field of view [block 1228] and applying similar modifications to the representation of the POI 108 [block 1230]. In one embodiment, the computing, described above, of the second orientation further includes minimizing a difference between the second and fourth orientations by adjusting the orientation of the representation of the POI 108 [block 1232].

In an alternative embodiment, the operation of the system 1100 for manipulating a user's attention with respect to a point of interest represented in a simulated field of view of a geographic locality during simulation of travel between locations therein, may include: receiving, from a user via a user interface coupled with a processor, a request to simulate travel via a route from a starting location of a plurality of locations within the geographic locality toward a destination location of the plurality of locations within the geographic locality, the route comprising a plurality of intermediate observation locations within the geographic locality sequentially via which the travel is to be simulated; identifying, by the processor, the POI, the POI being located at a POI location of a plurality of locations within the geographic locality and further characterized by a POI orientation; presenting, by the processor on a display coupled therewith, a simulated field of view comprising a first representation of a first subset of observable locations of a first set of observable locations within the geographic locality, the first set of observable locations comprising those locations of the plurality of locations within the geographic locality which would be visible to an observer oriented in any orientation and located at a first intermediate observation location of the plurality of intermediate observation locations of the route, the first subset of observable locations comprising those locations of the first set of observable locations which would be visible to an observer oriented in a first orientation and located at the first intermediate observation location; computing, by the processor upon simulated arrival at a second intermediate observation location of the plurality of intermediate observation locations and a second orientation there at and, based on a relationship between the POI location of the identified POI and the second intermediate observation location, whether the POI location is within a second subset of observable locations of a second set of observable locations within the geographic locality, the second set of observable locations comprising those locations of the plurality of locations within the geographic locality which would be visible to an observer oriented in any orientation and located at the second intermediate observation location of the plurality of intermediate observation locations of the route, the second subset of observable locations comprising those locations of the second set of observable locations which would be visible to an observer oriented in the second orientation and located at the second intermediate observation location, and further whether the POI orientation is oriented toward the second observation location, that the POI location is within the second subset of observable locations and the POI orientation is not oriented toward the second observation location, modifying a perceived orientation of a representation of the POI as presented within the simulated field of view so as to appear oriented toward the second observation location; and presenting, by the processor on the display coupled therewith, the simulated field of view comprising a second representation of the second subset of observable locations and including the modified representation of the POI.

In one embodiment, the modifying may further include modifying the perceived orientation of the representation of the POI so as to increase visual perceptibility of the representation of the POI to the user.

Alternatively or in addition thereto, the modifying may further include generating a representation of a polygon in the simulated field of view so as to appear located at the POI location and overlaying the representation of the POI over the polygon, modifying a perspective of the polygon with respect to the simulated field of view and applying similar modifications to the representation of the POI.

In one embodiment, the computing may further include minimizing a difference between the POI orientation and the second orientations by adjusting the orientation of the representation of the POI.

As discussed above, the disclosed embodiments may further relate to a method of conducting business whereby entities, such as advertisers or other sponsors, associated with one or more POI's 108 pay or otherwise compensate the operator and/or the user of the disclosed system 1100 to manipulate the user's attention, as described, with respect to those POI's 108. Such compensation may be based on number of POI's 108, the geographic radius or degree of proximity to a POI 108 that the user must navigate to affect the FOV 104, the extent of the effect on the FOV 104, the degree of exclusivity with respect to other sponsor's POI's 108, or other alterations to the POI orientation, or combinations thereof. In one embodiment, a sponsor may control a particular geographic region having the attention of any user navigating through that region drawn to their POI's 108. In another embodiment, a sponsor may sponsor an entire navigation routing having a the attention of the user navigating that route drawn to the sponsor's POI's 108 located along or near the route. Each time a new routing is generated in response to a user request, the system 1100 may assign a new sponsor thereto, such as based on a random, round robin or bidding/auction based assignment. The disclosed embodiments may further facilitate analysis of POI 108 presentations and user focus thereon. For example, statistical data may be maintained as to the frequency and extent to which a POI 108 is presented to a user, the coverage ratio or duration of presentation, or combinations thereof. Such statistics may be used to differentiate conventional navigation systems from the presently disclosed embodiments, e.g. difference in user attention gained thereby, and may be further used as the basis of a fee or charging structure for sponsors utilizing the system as was described.

In one embodiment, the compensation provided to the operator of the system 1100 supplements the operating cost thereof, allowing the operator to provide access to the system 1100 at a discount or for free. In another embodiment, the user may agree to be subject to the manipulation of their attention in exchange for monetary or other compensation, such as discounted or free access to the system 1100, or additional features such as free or discounted traffic information or alerts.

In one embodiment, the system 1100 may include an interface, such as a web page based user interface, for allowing sponsors to access the system 1100 to purchase POI 108 based attention manipulation as described. The interface may permit the sponsor to select the POI 108 and/or POI location, region or route(s), the extent or type of influence. Further, the interface may implement a fixed price system or an auction based system whereby sponsor bid over locations, regions, routes, etc.

As described above, the user may be associated with a profile which specifies interests and/or preferences of the user, demographic data about the user, etc. The system 1100 may process the profile to determine those sponsored POI's 108 of interest to the user such that only those POI's 108 exert the described effect on the user's FOV 104. As the likelihood of the user being interested in the POI 108 is greater, the system 1100 may command a higher rate of compensation from the sponsor's of those POI's 108. Accordingly, the system 1100 may provide an interface, such as a web page based user interface, which allows the user to specify their preferences or interests. Alternatively, or in addition thereto, profiles may be acquired from aggregators, such as Internet based e-commerce data aggregators, search engines, and the like.

It will be appreciated that the simulated field of view 104 provided by the disclosed embodiments may be interactive allowing, for example, a user to select a POI 108, or other indicator displayed therein, such as by using a mouse of touch screen, to cause some action. For example, selection of a POI 108 may cause the display of additional information about the POI 108, within the simulated FOV 104 or in a separate display, such as a separate web browser window. In one embodiment, selection of a POI 108 may cause a reroute or detour in the user's navigation to guide them to the POI 108.

In one embodiment, the system 1100 may provide an interface for government and/or private entities to specify geographic locations, regions, areas or specific POI's 108 which are private or otherwise sensitive and for which the user's attention should be directed away when they navigate proximate thereto. For example, the US military may request that a user's attention be directed away from a military base as they navigate nearby.

In one embodiment, the system 1100 may calculate the navigation route based on routing distance, travel time or other user selected parameter or the like as is known. Alternatively, or in addition thereto, the route may chosen according to the disclosed embodiments, to bring the user close to the sponsored POI's or away from competitive POI's. In one embodiment, the user may be compensated for accepting a sponsored route and the attendant manipulation of the simulated field of view as described, in exchange for compensation such as monetary compensation or complementary services, such as free traffic or other ancillary navigation information along the sponsored route where such information otherwise is provided, if at all, only in exchange for a fee.

In one embodiment, if the user stops or otherwise interrupts or pauses their navigation along the route and maintains their position at a particular intermediate observation location, the FOV 104 may be rotated/reoriented, e.g. gradually, toward/from the POI according to the disclosed embodiments. The rotation/reorientation may override a user selected orientation, e.g. as the user attempts to select a different orientation, the FOV 104 is immediate or gradually drawn back to toward the POI 108.

In one embodiment, POI's 108 may include products such as automobiles, which may be virtually inserted into the surrounding traffic or into empty or occupied parking spaces. Once inserted, the FOV 104 may be reoriented as described herein the draw attention to the POI 108.

Figure 13:
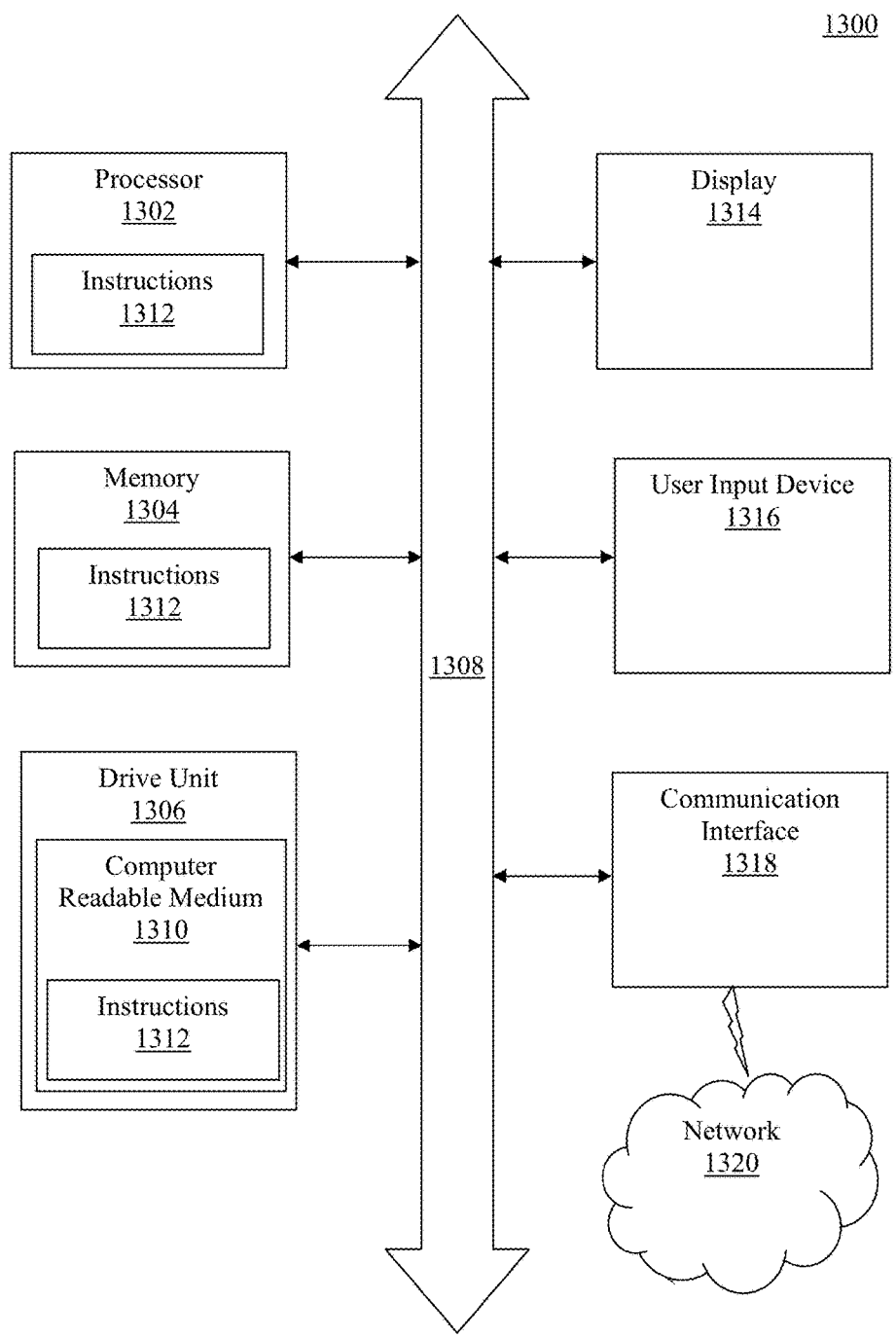
FIG. 13 depicts a block diagram of illustrative embodiment of a general computer system for use with the disclosed embodiments.

Referring to FIG. 13, an illustrative embodiment of a general computer system 1300 is shown which may be used to implement the system 1100. The computer system 1300 can include a set of instructions that can be executed to cause the computer system 1300 to perform any one or more of the methods or computer based functions disclosed herein. The computer system 1300 may operate as a standalone device or may be connected, e.g., using a network, to other computer systems or peripheral devices. Any of the components discussed above, such as the processor 1102, may be a computer system 1300 or a component in the computer system 1300. The computer system 1300 may implement a navigation system or application on behalf of an navigation data vendor, such as NAVTEQ North America, LLC, of which the disclosed embodiments are a component thereof.

In a networked deployment, the computer system 1300 may operate in the capacity of a server or as a client user computer in a client-server user network environment, or as a peer computer system in a peer-to-peer (or distributed) network environment. The computer system 1300 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 1300 can be implemented using electronic devices that provide voice, video or data communication. Further, while a single computer system 400 is illustrated, the term "system" shall also be taken to include any collection of systems or sub-systems that individually or jointly execute a set, or multiple sets, of instructions to perform one or more computer functions.

As illustrated in FIG. 13, the computer system 1300 may include a processor 1302, e.g., a central processing unit (CPU), a graphics processing unit (GPU), or both. The processor 1302 may be a component in a variety of systems. For example, the processor 1302 may be part of a standard personal computer or a workstation. The processor 1302 may be one or more general processors, digital signal processors, application specific integrated circuits, field programmable gate arrays, servers, networks, digital circuits, analog circuits, combinations thereof, or other now known or later developed devices for analyzing and processing data. The processor 1302 may implement a software program, such as code generated manually (i.e., programmed).

The computer system 1300 may include a memory 1304 that can communicate via a bus 1308. The memory 1304 may be a main memory, a static memory, or a dynamic memory. The memory 1304 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 1304 includes a cache or random access memory for the processor 1302. In alternative embodiments, the memory 1304 is separate from the processor 1302, such as a cache memory of a processor, the system memory, or other memory. The memory 1304 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 1304 is operable to store instructions executable by the processor 1302. The functions, acts or tasks illustrated in the figures or described herein may be performed by the programmed processor 1302 executing the instructions 1312 stored in the memory 1304. The functions, acts or tasks are independent of the particular type of instructions set, storage media, processor or processing strategy and may be performed by software, hardware, integrated circuits, firm-ware, microcode and the like, operating alone or in combination. Likewise, processing strategies may include multiprocessing, multitasking, parallel processing and the like.

As shown, the computer system 1300 may further include a display unit 1314, such as a liquid crystal display (LCD), an organic light emitting diode (OLED), a flat panel display, a solid state display, a cathode ray tube (CRT), a projector, a printer or other now known or later developed display device for outputting determined information. The display 1314 may act as an interface for the user to see the functioning of the processor 1302, or specifically as an interface with the software stored in the memory 1304 or in the drive unit 1306.

Additionally, the computer system 1300 may include an input device 1316 configured to allow a user to interact with any of the components of system 1300. The input device 1316 may be a number pad, a keyboard, or a cursor control device, such as a mouse, or a joystick, touch screen display, remote control or any other device operative to interact with the system 1300.

In a particular embodiment, as depicted in FIG. 13, the computer system 1300 may also include a disk or optical drive unit 1306. The disk drive unit 1306 may include a computer-readable medium 1310 in which one or more sets of instructions 1312, e.g. software, can be embedded. Further, the instructions 1312 may embody one or more of the methods or logic as described herein. In a particular embodiment, the instructions 1312 may reside completely, or at least partially, within the memory 1304 and/or within the processor 1302 during execution by the computer system 1300. The memory 1304 and the processor 1302 also may include computer-readable media as discussed above.

The present disclosure contemplates a computer-readable medium that includes instructions 1312 or receives and executes instructions 1312 responsive to a propagated signal, so that a device connected to a network 1320 can communicate voice, video, audio, images or any other data over the network 1320. Further, the instructions 1312 may be transmitted or received over the network 1320 via a communication interface 1318. The communication interface 1318 may be a part of the processor 1302 or may be a separate component. The communication interface 1318 may be created in software or may be a physical connection in hardware. The communication interface 1318 is configured to connect with a network 1320, external media, the display 1314, or any other components in system 1300, or combinations thereof. The connection with the network 1320 may be a physical connection, such as a wired Ethernet connection or may be established wirelessly as discussed below. Likewise, the additional connections with other components of the system 1300 may be physical connections or may be established wirelessly.

The network 1320 may include wired networks, wireless networks, or combinations thereof. The wireless network may be a cellular telephone network, an 802.11, 802.16, 802.20, or WiMax network. Further, the network 1320 may be a public network, such as the Internet, a private network, such as an intranet, or combinations thereof, and may utilize a variety of networking protocols now available or later developed including, but not limited to TCP/IP based networking protocols.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and anyone or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Figure 14:
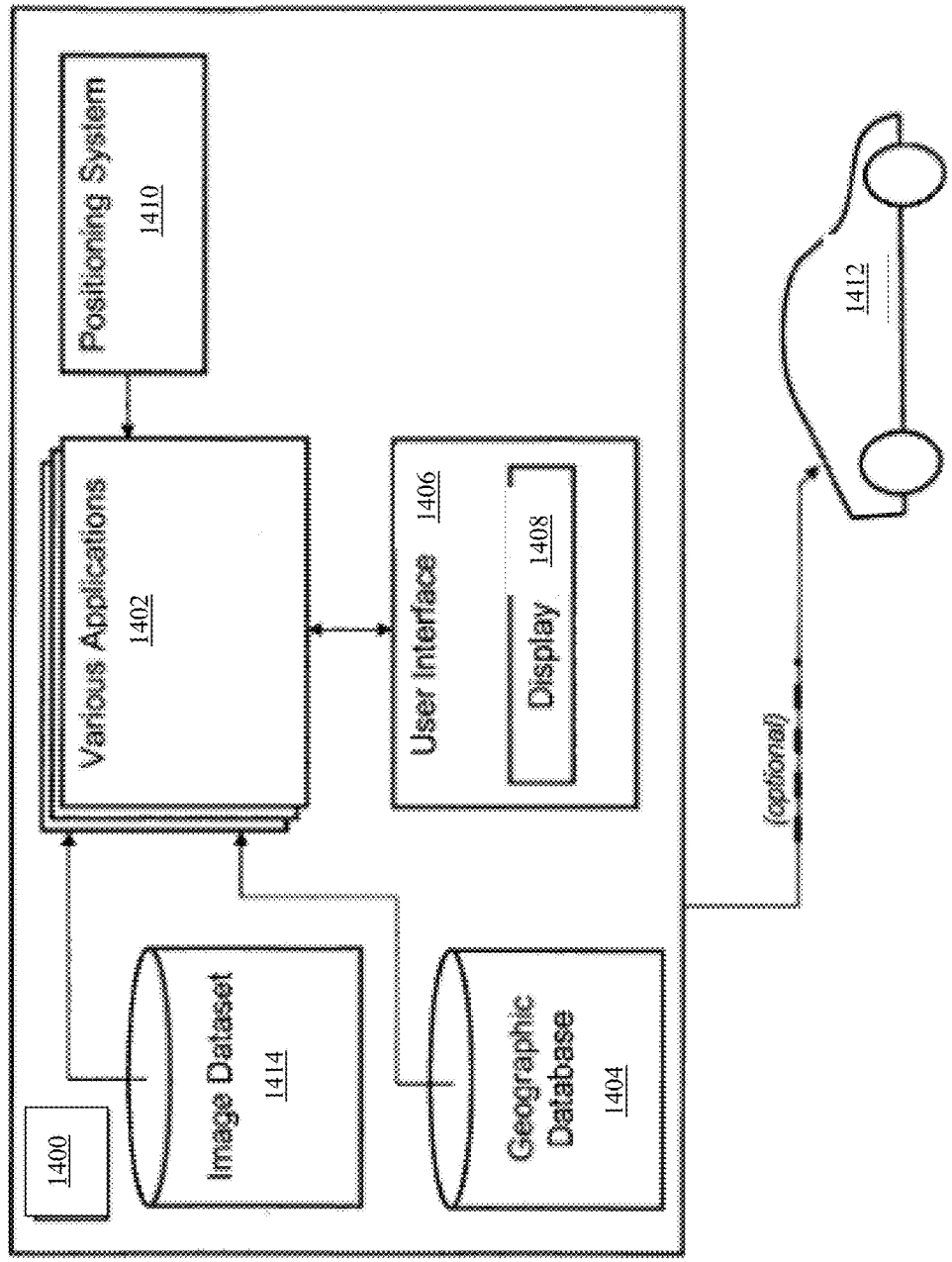
FIG. 14 depicts a block diagram of an exemplary end-user computing platform for use with the disclosed embodiments.

In one embodiment, the system 1100 may implemented as a device such as the exemplary computing platform 1400 shown in FIG. 14. This platform 1400 runs one or more applications 1402 including, for example, the compute program logic as discussed above which may be implemented as an application 1402 wherein the user navigates using tools provided by an interface 1406 (such as a keyboard, mouse, microphone, voice recognition software, and the like). In response, the application 1402 produces multi-angle views based on information from an image dataset 1414 and displays the views on the display 1408 of the user's interface 1406.

Some embodiments of the computing platform 1400 include access to a geographic information database 1404. Using this database 1404, the platform 1400 can provide navigation-related applications 1402 such as route calculation, route guidance, destination selection, electronic yellow pages, vehicle positioning, and map display. Other applications 1402 are also possible. This geographic database 1404 can include data about the geographic area in which a user is located. In some embodiments, the geographic database 1404 includes data about the roads in the geographic area, including data indicating the locations of the roads and intersections. The geographic database 1404 may also include information about the names of the roads, one-way streets, number of lanes, locations of traffic signals and signs, speed limits, turn restrictions, address ranges, and so on. The geographic database 1404 may also include information about objects of interest, such as businesses, landmarks, museums, ATMs, government offices, and so on. In some embodiments, the data in the geographic database 1404 are in a format that is optimized for providing navigation-related functions.

In some embodiments, applications 1402 have access to information from a positioning system 1410, such as a GPS device. If the computing platform is in a vehicle, such as vehicle 1412, the positioning system 1410 may include inertial sensors, differential wheel-speed sensors, a compass, or other equipment that facilitates determining the position of the user. The position may be determined as geographic coordinates (latitude, longitude, and altitude), street address, or in any other way.

In some embodiments, the computing platform 1400 is a combination of hardware, software, and data. The platform 1400 can be installed in a vehicle 1412 as an in-vehicle navigation system but may also be installed on a special-purpose, handheld navigation device, on a personal digital assistant, on a personal computer, or on a mobile telephone supporting a navigation application. The computing platform 1400 may be a standalone platform in which the hardware, software, and data are all located locally. Alternatively, the computing platform 1400 may be connected to a network, e.g., the Internet or a wireless network. In some embodiments, the image dataset 1414 and the geographic database 1404 are located remotely from the computing platform 1400 and are accessed via the network. In some embodiments, the image dataset 1414 and database 1404 are local to the computing platform 1400, but updates are received over the network. Some applications 1402 can also be provided, in whole or in part, over the network.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is therefore intended that the foregoing detailed description be regarded as illustrative rather than limiting, and that it be understood that it is the following claims, including all equivalents, that are intended to define the spirit and scope of this invention.

What is claimed is:

1. A computer implemented method of manipulating a user's attention with respect to a point of interest ("POI") represented in a simulated field of view of a geographic locality during simulation of travel between locations therein, the method comprising:

receiving, from a user via a user interface coupled with a processor, a request to simulate travel via a route from a starting location of a plurality of locations within the geographic locality toward a destination location of the plurality of locations within the geographic locality, the route comprising a plurality of intermediate observation locations within the geographic locality sequentially via which the travel is to be simulated, wherein the user interface is further operative to allow the user to select a simulated field of view at each of the plurality of intermediate observation locations along the route;

identifying, by the processor, the POI, the POI being located at a POI location of a plurality of locations within the geographic locality; and simulating travel via the route in a direction of travel from the starting location toward the destination location via the plurality of intermediate observation locations, the simulating further comprising at each of the plurality of intermediate observation locations:

presenting, by the processor on a display coupled therewith based on a selection received from the user via the user interface, a simulated field of view comprising a first representation of a first subset of a first set of observable locations within the geographic locality, the first set of observable locations comprising those locations of the plurality of locations within the geographic locality which would be visible to an observer oriented in any orientation and located at a first intermediate observation location of the plurality of intermediate observation locations of the route, the first subset of observable locations comprising those locations of the first set of observable locations which would be visible to an observer oriented in a first orientation and located at the first intermediate observation location;

computing, by the processor based on a relationship between the POI location of the identified POI and a second intermediate observation location of the plurality of intermediate observation locations of the route to which travel of the observer from the first intermediate observation location is to be simulated, a second orientation of the observer located at the second intermediate observation location whereby, based thereon, a second subset of a second set of observable locations would be visible thereto, the second set of observable locations comprising those locations of the plurality of locations of the geographic locality which would be visible to the observer oriented in any orientation and located at the second intermediate observation location, the second orientation being different from both a third orientation, oriented in a direction of travel from the first intermediate observation location to the second intermediate observation location, and a fourth orientation, oriented in a direction of travel from the second intermediate observation location to a third intermediate observation location of the plurality of intermediate observation locations of the route to which travel of the observer from the second intermediate observation location is to be simulated, the second orientation being computed to be towards the POI based on a first condition and away from the POI based on a second condition; and presenting, irrespective of any selection received from the user via the user interface, by the processor on the display coupled therewith upon simulated arrival at the second intermediate observation location, the simulated field of view comprising a second representation of the second subset of the second set of observable locations.

2. The computer implemented method of claim 1 wherein the POI comprises an advertisement located at the POI location.

3. The computer implemented method of claim 1 wherein the identifying further comprises receiving compensation from an entity associated with the POI and, based thereon, the computing further comprises computing the second orientation to be toward the POI.

4. The computer implemented method of claim 1 wherein the identifying further comprises identifying the POI based on a profile of the user and, based thereon, the computing further comprises computing the second orientation to be toward the POI.

5. The computer implemented method of claim 1 wherein the processor is further coupled with an image database having stored therein a plurality of images, each of which is representative of a portion of the geographic locality as viewed from a particular location of the plurality of locations therein, and wherein the computing further comprising selecting an image from the image database which most closely comprises the second subset of observable locations over the other images stored in the image database, the presenting of the second representation comprising presentation of the selected image.

6. The computer implemented method of claim 1 further comprising determining, by the processor, that, for a third subset of observable locations of the second set of observable locations which includes those locations of the second set of observable locations which would be visible to the observer located at the second intermediate observation location and oriented in the fourth orientation, the third subset of observable locations does not include the POI location, and, based thereon, further computing, by the processor, the second orientation such that the second subset of observable locations includes the POI location.

7. The computer implemented method of claim 6 wherein the extent to which the second orientation is computed to be toward the POI location is a function of the proximity of the second intermediate observation location to the POI location.

8. The computer implemented method of claim 6 wherein the second orientation is computed to be more toward the POI location than the first orientation when the second intermediate observation location is geographically closer to the POI location than the first intermediate observation location and wherein the second orientation is computed to be more away from the POI location than the first orientation when the second intermediate observation location is geographically further from the POI location than the first intermediate observation location.

9. The computer implemented method of claim 6 further comprising augmenting a representation of the POI within the second representation so as to visually distinguish the representation from a remainder of the second representation.

10. The computer implemented method of claim 7 wherein the extent to which the second orientation is computed to be toward the POI location is further a function of a difference between the third and fourth orientations and a fifth orientation oriented from the second observation location directly toward the POI location.

11. The computer implemented method of claim 1 further comprising determining, by the processor, that, for a third subset of observable locations of the second set of observable locations which includes those locations of the second set of observable locations which would be visible to the observer located at the second intermediate observation location and oriented in the fourth orientation, the third subset of observable locations includes the POI location, and, based thereon, further computing, by the processor, the second orientation such that the second subset of observable locations does not include the POI location.

12. The computer implemented method of claim 1 determining, by the processor, that the second set of observable locations does not include the POI location and, based thereon, altering the second representation to include a representation of the POI as if the POI location were included in the second subset of observable locations.

13. The computer implemented method of claim 1 wherein the second orientation comprises a direction from the second intermediate observation location towards the POI location.

14. The computer implemented method of claim 1 wherein the POI is further characterized by a POI orientation, the presenting of the simulated field of view comprising the second representation further comprising determining whether the POI orientation is oriented toward the second observation location and, if the POI orientation is not oriented toward the second observation location, modifying a perceived orientation of a representation of the POI as presented within the simulated field of view so as to appear oriented toward the second observation location.

15. The computer implemented method of claim 14 wherein the modifying further comprises modifying the perceived orientation of the representation of the POI so as to increase visual perceptibility of the representation of the POI to the user.

16. The computer implemented method of claim 14 wherein the modifying further comprises generating a representation of a polygon in the simulated field of view so as to appear located at the POI location and overlaying the representation of the POI over the polygon, modifying a perspective of the polygon with respect to the simulated field of view and applying similar modifications to the representation of the POI.

17. The computer implemented method of claim 14 wherein the computing further comprises minimizing a difference between the second and fourth orientations by adjusting the orientation of the representation of the POI.

18. The computer implemented method of claim 1 further comprising:
presenting, subsequent to the presenting of the simulated field of view comprising a second representation of the second subset of the second set of observable locations, by the processor on a display coupled therewith based on a selection received from the user via the user interface, a simulated field of view comprising a third representation of a third subset of a third set of observable locations within the geographic locality, the third set of observable locations comprising those locations of the plurality of locations within the geographic locality which would be visible to an observer oriented in any orientation and located at the second intermediate observation location of the plurality of intermediate observation locations of the route, the third subset of observable locations comprising those locations of the third set of observable locations which would be visible to an observer oriented in a fifth orientation selected by the user, different from the second orientation, and located at the second intermediate observation location.

19. A system for manipulation of a user's attention with respect to a point of interest ("POI") represented in a simulated field of view of a geographic locality during simulation of travel between locations therein, the system comprising a processor and a memory coupled therewith, the system further comprising:
first computer program logic stored in the memory and executable by the processor to cause the processor to receive, from a user via a user interface coupled with the processor, a request to simulate travel via a route from a starting location of a plurality of locations within the geographic locality toward a destination location of the plurality of locations within the geographic locality, the route comprising a plurality of intermediate observation locations within the geographic locality sequentially via which the travel is to be simulated, wherein the first computer program logic is further executable by the processor to cause the processor to allow, via the user interface, the user to select a simulated field of view at each of the plurality of intermediate observation locations along the route;
second computer program logic stored in the memory and executable by the processor to cause the processor to identify the POI, the POI being located at a POI location of a plurality of locations within the geographic locality; and
wherein the system is operative to simulate travel via the route in a direction of travel from the starting location toward the destination location via the plurality of intermediate observation locations using, at each of the plurality of intermediate observation locations:
third computer program logic stored in the memory and executable by the processor to cause the processor to present on a display coupled therewith based on a selection received from the user via the user interface, a simulated field of view comprising a first representation of a first subset of a first set of observable locations within the geographic locality, the first set of observable locations comprising those locations of the plurality of locations within the geographic locality which would be visible to an observer oriented in any orientation and located at a first intermediate observation location of the plurality of intermediate observation locations of the route, the first subset of observable locations comprising those locations of the first set of observable locations which would be visible to the observer oriented in a first orientation and located at the first intermediate observation location;
fourth computer program logic stored in the memory and executable by the processor to cause the processor to compute, based on a relationship between the POI location and a second intermediate observation location of the plurality of intermediate observation locations of the route to which travel of the observer from the first intermediate observation location is to be simulated, a second orientation of the observer located at the second intermediate observation location whereby, based thereon, a second subset a second set of observable locations would be visible thereto, the second set of observable locations comprising those locations of the plurality of locations of the geographic locality which would be visible to the observer oriented in any orientation and located at the second intermediate observation location, the second orientation being different from both a third orientation, oriented in a direction of travel from the first intermediate observation location to the second intermediate observation location, and a fourth orientation, oriented in a direction of travel from the second intermediate observation location to a third intermediate observation location of the plurality of intermediate observation locations of the route to which travel of the observer from the second intermediate observation location is to be simulated, the second orientation being computed to be towards the POI based on a first condition and away from the POI based on a second condition; and
fifth computer program logic stored in the memory and executable by the processor to cause the processor, irrespective of any selection received from the user via the user interface, to present on the display coupled therewith upon simulated arrival at the second intermediate observation location, the simulated field of view comprising a second representation of the second subset of the second set of observable locations.

20. The system of claim 19 wherein the POI comprises an advertisement located at the POI location.

21. The system of claim 19 wherein the second computer program logic is further executable by the processor to cause the processor to account for receipt of compensation from an entity associated with the POI and, based thereon, the fourth computer program logic is further executable by the processor to cause the processor to compute the second orientation to be toward the POI.

22. The system of claim 19 wherein the second computer program logic is further executable by the processor to cause the processor to identify the POI based on a profile of the user and, based thereon, the fourth computer program logic is further executable by the processor to cause the processor to compute the second orientation to be toward the POI.

23. The system of claim 19 further comprising an image database having stored therein a plurality of images, each of which is representative of a portion of the geographic locality as viewed from a particular location of the plurality of locations therein, and wherein the fourth computer program logic is further executable by the processor to cause the processor to select an image from the image database which most closely comprises the second subset of observable locations over the other images stored in the image database, the second representation comprising the selected image.

24. The system of claim 19 further comprising sixth computer program logic stored in the memory and executable by the processor to cause the processor to determine, that, for a third subset of observable locations of the second set of observable locations which includes those locations of the second set of observable locations which would be visible to the observer located at the second intermediate observation location and oriented in the fourth orientation, the third subset of observable locations does not include the POI location, and, based thereon, the fourth computer program logic being further executable by the processor to cause the processor to compute the second orientation such that the second subset of observable locations includes the POI location.

25. The system of claim 24 wherein the extent to which the second orientation is computed to be toward the POI location is a function of the proximity of the second intermediate observation location to the POI location.

26. The system of claim 24 wherein the second orientation is computed to be toward the POI location when the second intermediate observation location is geographically closer to the POI location than the first intermediate observation location and wherein the second orientation is computed to be away from the POI location when the second intermediate observation location is geographically further from the POI location than the first intermediate observation location.

27. The system of claim 24 further comprising seventh computer program logic stored in the memory and executable by the processor to cause the processor to augment a representation of the POI within the second representation so as to visually distinguish the representation from a remainder of the second representation.

28. The system of claim 25 wherein the extent to which the second orientation is computed to be toward the POI location is further a function of a difference between the third and fourth orientations and a fifth orientation oriented from the second observation location directly toward the POI location.

29. The system of claim 19 further comprising sixth computer program logic stored in the memory and executable by the processor to cause the processor to determine, that, for a third subset of observable locations of the second set of observable locations which includes those locations of the second set of observable locations which would be visible to the observer located at the second intermediate observation location and oriented in the fourth orientation, the third subset of observable locations includes the POI location, and, based thereon, the fourth computer program logic being further executable by the processor to cause the processor to compute the second orientation such that the second subset of observable locations does not include the POI location.

30. The system of claim 19 further comprising sixth computer program logic stored in the memory and executable by the processor to cause the processor to determine that the second set of observable locations does not include the POI location and, based thereon, the fifth computer program logic is further executable by the processor to alter the second representation to include a representation of the POI as if the POI location were included in the second subset of observable locations.

31. The system of claim 19 wherein the second orientation comprises a direction from the second intermediate observation location towards the POI location.

32. The system of claim 19 wherein the POI is further characterized by a POI orientation, the fifth computer program logic is further executable by the processor to determine whether the POI orientation is oriented toward the second observation location and, if the POI orientation is not oriented toward the second observation location, modify a perceived orientation of a representation of the POI as presented within the simulated field of view so as to appear oriented toward the second observation location.

33. The system of claim 32 wherein the fifth computer program logic is further executable by the processor to cause the processor to modify the perceived orientation of the representation of the POI so as to increase optical perceptibility of the representation of the POI to the user.

34. The system of claim 32 wherein the fifth computer program logic is further executable by the processor to cause the processor to generate a representation of a polygon in the simulated field of view so as to appear located at the POI location and overlay the representation of the POI over the polygon, modify a perspective of the polygon with respect to the simulated field of view and apply similar modifications to the representation of the POI.

35. The system of claim 32 wherein the fourth computer program logic is further executable by the processor to cause the processor to minimize a difference between the second and fourth orientations by adjusting the orientation of the representation of the POI.

36. The system of claim 19 wherein the fifth computer program logic is further executable by the processor to cause the processor to present, subsequent to the presentation of the simulated field of view comprising a second representation of the second subset of the second set of observable locations, based on a selection received from the user via the user interface, a simulated field of view comprising a third representation of a third subset of a third set of observable locations within the geographic locality, the third set of observable locations comprising those locations of the plurality of locations within the geographic locality which would be visible to an observer oriented in any orientation and located at the second intermediate observation location of the plurality of intermediate observation locations of the route, the third subset of observable locations comprising those locations of the third set of observable locations which would be visible to an observer oriented in a fifth orientation selected by the user, different from the second orientation, and located at the second intermediate observation location.

37. A system for manipulation of a user's attention with respect to a point of interest ("POI") represented in a simulated field of view of a geographic locality during simulation of travel between locations therein, the system comprising:
  means for receiving, from a user via a user interface means, a request to simulate travel via a route from a starting location of a plurality of locations within the geographic locality toward a destination location of the plurality of locations within the geographic locality, the route comprising a plurality of intermediate observation locations within the geographic locality sequentially via which the travel is to be simulated;
  means for identifying the POI, the POI being located at a POI location of a plurality of locations within the geographic locality; and
  means for simulating travel via the route in a direction of travel from the starting location toward the destination location via the plurality of intermediate observation locations, the means for simulating further comprising at each of the plurality of intermediate observation locations:
  means for presenting on a display, a simulated field of view comprising a first representation of a first subset of a first set of observable locations within the geographic locality, the first set of observable locations comprising those locations of the plurality of locations within the geographic locality which would be visible to an observer oriented in any orientation and located at a first intermediate observation location of the plurality of intermediate observation locations of the route, the first subset of observable locations comprising those locations of the first set of observable locations which would be visible to an observer oriented in a first orientation and located at the first intermediate observation location;

means for computing, based on a relationship between the POI location of the identified POI and a second intermediate observation location of the plurality of intermediate observation locations of the route to which travel of the observer from the first intermediate observation location is to be simulated, a second orientation of the observer located at the second intermediate observation location whereby, based thereon, a second subset of the second set of observable locations would be visible thereto, the second set of observable locations comprising those locations of the plurality of locations of the geographic locality which would be visible to the observer oriented in any orientation and located at the second intermediate observation location, the second orientation being different from both a third orientation, oriented in a direction of travel from the first intermediate observation location to the second intermediate observation location, and a fourth orientation, oriented in a direction of travel from the second intermediate observation location to a third intermediate observation location of the plurality of intermediate observation locations of the route to which travel of the observer from the second intermediate observation location is to be simulated, the second orientation being computed to be towards the POI based on a first condition and away from the POI based on a second condition; and means for presenting, by the processor on the display coupled therewith upon simulated arrival at the second intermediate observation location, the simulated field of view comprising a second representation of the second subset of the second set of observable locations.

* * * * *